(12) United States Patent
Macadaan et al.

(10) Patent No.: US 9,715,543 B2
(45) Date of Patent: Jul. 25, 2017

(54) PERSONALIZATION TECHNIQUES USING IMAGE CLOUDS

(75) Inventors: Mike Macadaan, Livermore, CA (US); David J. Liu, Chevy Chase, MD (US); William G. Wetherell, San Francisco, CA (US); James D. Simmons, Reston, VA (US); Sudhir Tonse, San Francisco, CA (US); Arun K. Ranganathan, San Francisco, CA (US)

(73) Assignee: AOL Inc., Dulles, VA (US)

( * ) Notice: Subject to any disclaimer, the term of this patent is extended or adjusted under 35 U.S.C. 154(b) by 2268 days.

(21) Appl. No.: 12/018,524

(22) Filed: Jan. 23, 2008

(65) Prior Publication Data

US 2008/0209339 A1    Aug. 28, 2008

Related U.S. Application Data

(60) Provisional application No. 60/892,201, filed on Feb. 28, 2007.

(51) Int. Cl.
| | | |
|---|---|---|
| G06F 3/00 | (2006.01) | |
| G06F 17/30 | (2006.01) | |
| G06F 3/0482 | (2013.01) | |
| H04L 29/08 | (2006.01) | |
| G06Q 30/02 | (2012.01) | |

(52) U.S. Cl.
CPC ...... *G06F 17/30864* (2013.01); *G06F 3/0482* (2013.01); *G06F 17/3056* (2013.01); *G06F 17/30274* (2013.01); *G06F 17/30554* (2013.01); *G06F 17/30867* (2013.01); *G06Q 30/0255* (2013.01); *G06Q 30/0269* (2013.01); *G06Q 30/0271* (2013.01); *H04L 67/22* (2013.01); *H04L 67/306* (2013.01)

(58) Field of Classification Search
USPC .................... 715/738, 744, 745, 747, 838
See application file for complete search history.

(56) References Cited

U.S. PATENT DOCUMENTS

| | | |
|---|---|---|
| 5,371,673 A | 12/1994 | Fan |
| 5,452,413 A | 9/1995 | Blades |
| 5,717,923 A | 2/1998 | Dedrick |
| 5,740,549 A | 4/1998 | Reilly et al. |
| 5,796,945 A * | 8/1998 | Tarabella ............ 709/219 |
| 5,938,530 A | 8/1999 | Watanabe |
| 6,108,637 A | 8/2000 | Blumenau |

(Continued)

FOREIGN PATENT DOCUMENTS

KR    1020020045626 A    6/2002

OTHER PUBLICATIONS

U.S. Appl. No. 12/018,622, filed Jan. 23, 2008, Macadaan et al.

(Continued)

*Primary Examiner* — Thanh Vu
(74) *Attorney, Agent, or Firm* — Finnegan, Henderson, Farabow, Garrett & Dunner LLP

(57) ABSTRACT

Systems and methods for personalization using image clouds to represent content. Image clouds can be used to identify initial user interest, present recommended content, present popular content, present search results, and present user profile information. Image clouds are interactive, allowing users to select images displayed in the image cloud, which can contribute to presenting more personalized content as well as updating a user's profile.

20 Claims, 20 Drawing Sheets

(56) References Cited

U.S. PATENT DOCUMENTS

| | | |
|---|---|---|
| 6,182,097 B1 | 1/2001 | Hansen et al. |
| 6,256,633 B1 | 7/2001 | Dharap |
| 6,437,866 B1 | 8/2002 | Flynn |
| 6,464,583 B1 | 10/2002 | Kidron |
| 6,763,386 B2 | 7/2004 | Davis et al. |
| 6,807,558 B1 | 10/2004 | Hassett et al. |
| 6,853,982 B2 | 2/2005 | Smith et al. |
| 6,879,979 B2 | 4/2005 | Hindawi et al. |
| 6,914,517 B2 | 7/2005 | Kinsella |
| 6,996,782 B2 | 2/2006 | Parker et al. |
| 7,020,646 B2 | 3/2006 | Bexel et al. |
| 7,062,483 B2 | 6/2006 | Ferrari |
| 7,089,297 B1 | 8/2006 | Salas et al. |
| 7,127,473 B2 | 10/2006 | Agassi et al. |
| 7,254,631 B2 | 8/2007 | Crudele et al. |
| 7,571,394 B2 | 8/2009 | Garbow |
| 7,612,773 B2 | 11/2009 | Magnin et al. |
| 7,689,682 B1 | 3/2010 | Eldering et al. |
| 7,693,827 B2 | 4/2010 | Zamir et al. |
| 7,702,730 B2 | 4/2010 | Spataro et al. |
| 7,703,030 B2 | 4/2010 | Smirin et al. |
| 7,716,199 B2 | 5/2010 | Guha |
| 7,716,223 B2 | 5/2010 | Haveliwala et al. |
| 7,720,723 B2 | 5/2010 | Dicker et al. |
| 7,724,978 B2 | 5/2010 | Nonaka et al. |
| 7,725,523 B2 | 5/2010 | Bolnick et al. |
| 7,735,013 B2 | 6/2010 | Shaouy et al. |
| 7,750,909 B2 | 7/2010 | Purang et al. |
| RE41,754 E | 9/2010 | Knight |
| 7,801,956 B1 | 9/2010 | Cumberbatch et al. |
| 7,809,740 B2 | 10/2010 | Chung et al. |
| 7,814,109 B2 | 10/2010 | Brower et al. |
| 7,814,116 B2 | 10/2010 | Hauser |
| 7,904,448 B2 | 3/2011 | Chung et al. |
| 7,908,183 B2 | 3/2011 | Jacobi et al. |
| 7,970,664 B2 | 6/2011 | Linden et al. |
| 8,073,719 B2 | 12/2011 | Orttung et al. |
| 8,095,402 B2 | 1/2012 | Orttung et al. |
| 8,103,947 B2 | 1/2012 | Lunt et al. |
| 8,364,514 B2 | 1/2013 | Macbeth et al. |
| 8,484,577 B2 | 7/2013 | Oliver et al. |
| 2002/0016800 A1 | 2/2002 | Spivak et al. |
| 2002/0052873 A1 | 5/2002 | Delgado et al. |
| 2002/0078056 A1 | 6/2002 | Hunt et al. |
| 2002/0093680 A1 | 7/2002 | Tanaka |
| 2002/0147628 A1 | 10/2002 | Specter et al. |
| 2002/0169782 A1 | 11/2002 | Lehmann et al. |
| 2002/0191024 A1 | 12/2002 | Huneycutt |
| 2002/0198775 A1 | 12/2002 | Ryan |
| 2003/0041050 A1 | 2/2003 | Smith et al. |
| 2003/0161003 A1 | 8/2003 | Herbert |
| 2003/0217332 A1 | 11/2003 | Smith et al. |
| 2003/0227479 A1 | 12/2003 | Mizrahi et al. |
| 2004/0017395 A1 | 1/2004 | Cook |
| 2004/0039814 A1 | 2/2004 | Crabtree et al. |
| 2004/0078225 A1 | 4/2004 | Schramm-Apple et al. |
| 2004/0111360 A1 | 6/2004 | Albanese |
| 2004/0141003 A1 | 7/2004 | Nivers et al. |
| 2005/0033657 A1 | 2/2005 | Herrington et al. |
| 2005/0055450 A1 | 3/2005 | Gang |
| 2005/0060353 A1 | 3/2005 | Tan et al. |
| 2005/0149395 A1 | 7/2005 | Henkin |
| 2005/0165743 A1 | 7/2005 | Bharat et al. |
| 2005/0193335 A1 | 9/2005 | Dorai et al. |
| 2005/0216336 A1 | 9/2005 | Roberts et al. |
| 2005/0240580 A1 | 10/2005 | Zamir et al. |
| 2006/0026147 A1 | 2/2006 | Cone |
| 2006/0041550 A1 | 2/2006 | Bennett et al. |
| 2006/0053194 A1 | 3/2006 | Schneider et al. |
| 2006/0080103 A1 | 4/2006 | Van Breemen |
| 2006/0080321 A1 | 4/2006 | Horn et al. |
| 2006/0101336 A1 | 5/2006 | Edwards et al. |
| 2006/0112108 A1 | 5/2006 | Eklund et al. |
| 2006/0171683 A1 | 8/2006 | Battaglia et al. |
| 2006/0179072 A1 | 8/2006 | Eves et al. |
| 2006/0242139 A1 | 10/2006 | Butterfield et al. |
| 2006/0242178 A1 | 10/2006 | Butterfield et al. |
| 2007/0050613 A1 | 3/2007 | Islam et al. |
| 2007/0078832 A1 | 4/2007 | Ott et al. |
| 2007/0112761 A1 | 5/2007 | Xu et al. |
| 2007/0112762 A1 | 5/2007 | Brubaker |
| 2007/0130129 A1 | 6/2007 | Wagle |
| 2007/0143128 A1 | 6/2007 | Tokarev et al. |
| 2007/0233671 A1 | 10/2007 | Oztekin et al. |
| 2007/0250791 A1 | 10/2007 | Halliday et al. |
| 2007/0260624 A1 | 11/2007 | Chung et al. |
| 2008/0005693 A1 | 1/2008 | Oliver et al. |
| 2008/0010084 A1 | 1/2008 | Castro et al. |
| 2008/0040673 A1 | 2/2008 | Zuckerberg et al. |
| 2008/0059897 A1 | 3/2008 | Dilorenzo |
| 2008/0071029 A1 | 3/2008 | Motte et al. |
| 2008/0072145 A1 | 3/2008 | Blanchard et al. |
| 2008/0077569 A1* | 3/2008 | Lee et al. ............ 707/5 |
| 2008/0115068 A1 | 5/2008 | Smith |
| 2008/0120289 A1 | 5/2008 | Golan et al. |
| 2008/0134042 A1 | 6/2008 | Jankovich |
| 2008/0140524 A1 | 6/2008 | Anand et al. |
| 2008/0201645 A1 | 8/2008 | Francis et al. |
| 2008/0209339 A1 | 8/2008 | Macadaan et al. |
| 2008/0209340 A1 | 8/2008 | Tonse et al. |
| 2008/0209343 A1 | 8/2008 | Macadaan et al. |
| 2008/0209349 A1 | 8/2008 | Macadaan et al. |
| 2008/0209350 A1 | 8/2008 | Sobotka et al. |
| 2008/0229244 A1 | 9/2008 | Markus et al. |
| 2008/0250332 A1 | 10/2008 | Ferrell et al. |
| 2008/0263446 A1 | 10/2008 | Altberg et al. |
| 2008/0263460 A1 | 10/2008 | Altberg et al. |
| 2008/0288588 A1 | 11/2008 | Andam et al. |
| 2008/0306749 A1 | 12/2008 | Fredlund et al. |
| 2009/0006974 A1 | 1/2009 | Harinarayan et al. |
| 2009/0055748 A1 | 2/2009 | Dieberger et al. |
| 2009/0070665 A1 | 3/2009 | Chijiiwa et al. |
| 2009/0083229 A1 | 3/2009 | Gupta |
| 2009/0112837 A1 | 4/2009 | Modani et al. |
| 2009/0113319 A1 | 4/2009 | Dawson et al. |
| 2009/0150798 A1 | 6/2009 | Park et al. |
| 2009/0160859 A1 | 6/2009 | Horowitz et al. |
| 2009/0171754 A1 | 7/2009 | Kane et al. |
| 2009/0196574 A1 | 8/2009 | Lidestri |
| 2009/0198506 A1 | 8/2009 | Gupta |
| 2009/0271283 A1 | 10/2009 | Fasnacht et al. |
| 2010/0094859 A1 | 4/2010 | Gupta |
| 2010/0161558 A1 | 6/2010 | Goldberg et al. |
| 2010/0218118 A1 | 8/2010 | Bronkema |
| 2010/0251128 A1 | 9/2010 | Cordasco |
| 2011/0010384 A1 | 1/2011 | Luo et al. |
| 2011/0258552 A1 | 10/2011 | White |

OTHER PUBLICATIONS

U.S. Appl. No. 12/031,340, filed Feb. 14, 2008, Sobotka et al.
U.S. Appl. No. 12/031,389, filed Feb. 14, 2008, Tonse et al.
U.S. Appl. No. 12/036,948, filed Feb. 25, 2008, Macadaan et al.
U.S. Appl. No. 12/037,700, filed Feb. 26, 2008, Macadaan et al.
Unintrusive Customization Techniques for Web Advertising, by Marc Langheinrich, Atsuyoshi Nakamura, Naoki Abe, Tomonari Kamba, Yoshiyuki Koseki, Amsterdam, Netherlands, 1999, [online] [retrieved on Oct. 12, 2006], 19 pgs. Retrieved from the Internet: http://www.vs.inf.ethz.ch/publ/papers/www8-adwiz/.
Personalization, Wikipedia [online] [retrieved on Feb. 13, 2007], 2 pgs. Retrieved from the Internet: http://en.wikipedia.org/wiki/Personalization.
Recommender system, Wikipedia [online] [retrieved on Feb. 13, 2007], 2 pgs. Retrieved from the Internet: http://en.wikipedia.org/org/Recommendation_system.
Collaborative filtering, Wikipedia [online] [retrieved on Feb. 13, 2007], 6 pgs. Retrieved from the Internet: http://en.wikipedia.org/org/Collaborative_filtering.
Personalization is Over-Rated, Jacob Nielson's Alertbox, Oct. 4, 1998 [online] [retrieved on Feb. 13, 2007], 4 pgs, Retrieved from the Internet: http://www.useit.com/alertbox/981004.html.

(56) References Cited

OTHER PUBLICATIONS

Personalization of Web Services: Opportunities and Challenges, Monica Bennett, Jun. 22, 2001, Ariadne Issue 28, [online] [retrieved online Feb. 13, 2007], 14 pgs, Retrieved from the Internet: http://www.ariadne.ac.uk/issue28/personalization.
CIO Definitions; personalization, [online] [retrieved on Feb. 13, 2007], 2 pgs, Retrieved from the Internet: http://searchcio.target.com/sDefinition/0,,sid19_gci532341,oo.html.
Consumers Want Personalization and Privacy, Sean Michael Kerner, Aug. 16, 2005, [online] [retrieved on Feb. 13, 2007], 3 pgs, Retrieved from the Internet: http://www.clickz.com/showPage.html?page=3527716.
Personalization with ASP .NET 2.0, Jayesh Patel, Bryan Acker, Robert McGovern, Infusion Development, Jun. 2006 [online] [retrieved on Feb. 13, 2007], 15 pgs, Retrieved from the Internet: http://msdn2.microsoft.com/en-us/library/ms379593(VS.80,d=printer).aspx.
Personally Speaking, Sep Kamvar, Marissa Mayer, Feb. 2, 2007, [online] [retrieved on Feb. 13, 2007], 3 pgs, Retrieved from the Internet: http://googleblog.blogspot.com/2007/02/personally-speaking.html.
The New Wave of Personalization and Who is Joining in the Game, Tamar Weinberg, Feb. 9, 2007, [online] [retrieved on Feb. 13, 2007], 5 pgs, Retrieved from the Internet: http://www.10e20.com/2007/02/09/the-new-wave-of-personalization-and-who-joining-in-the-game/.
More distributed tags means more personalization, Lucas McDonnell, Feb. 8, [online] [retrieved on Feb. 13, 2007], 2 pgs, Retrieved from the Internet: http://www.lucasmcdonnell.com/more-distributed-tags-means-more-personalization.
Google Ramps Up Personalized Search, Danny Sullivan, Feb. 2, 2007, [online] [retrieved on Feb. 13, 2007], 11 pgs, Retrieved from the Internet: http://searchengineland.com/070202-224617.php.
Search engine personalization: An exploratory study, Yashmeet Khopkar, Amanda Spink, C. Lee Giles, Prital Shah, Sandip Debnath, First Monday, vol. 8, No. 7, Jul. 2003, [online] [retrieved on Feb. 13, 2007], 23 pgs, Retrieved from the Internet: http://www.firstmonday.org/issues/issue8_7/khopar/index.html.
Oracle9i AS Personalization Tags, [online] [retrieved on Feb. 13, 2007], 52 pgs, Retrieved from the Internet: http://.di.unipi.it/~ghelli/didattica/bdl/A97329_03/web.902/a95883/personal.htm.
"Personalization", [online] [retrieved on Feb. 13, 2007], 2 pgs, Retrieved from the Internet: http://www.blogshop.com/tagview.htm?itemid=personalization.
Tag Cloud, [online] [retrieved on Feb. 13, 2007], 2 pgs, Retrieved from the Internet: http://www.bloghop.com/tags.htm.
Tired of forgetting your favorite URL's? , [online] [retrieved on Feb. 13, 2007], 12 pgs, Retrieved from the Internet: http://blogmarks.net/marks/tag/personalization.
PenScreen Home, [online] [retrieved on Feb. 28, 2008], 2 pgs, Retrieved from the Internet: http://www.penscreen.com/.
Vidoop.com, [online] [retrieved on Aug. 21, 2007], 2 pgs, Retrieved from the Internet:vidoop.com/.
Catchy Colors Image Cloud, [online] [retrieved on Jul. 30, 2007], 2 pgs, Retrieved from the Internet:http://www.flickr.com/photos/icerunner/151794631.
My Findory News, [online] [retrieved on Feb. 28, 2007], 3 pgs, Retrieved from the Internet: http://web.archive.org/20070226221536/http://findory.com/.
A brief history of Findory, Greg Linden, Jan. 3, 2008, [online] [retrieved on Feb. 28, 2007], 3 pgs, Retrieved from the Internet: http://glinden.blogspot.com/2008/01/breif-history-of-findory.html.
Sergey Brin and Lawrence Page, The Anatomy of a Large-Scale Hypertextual Web Search Engine, Computer Science Dept., Stanford University, 20 pages.
Kent Bye "Flowcharts for Drupal Tag Clouds" Jun. 23, 2005.
Ching-Cheng Lee, Wei Xu, "Category-Based Web Personalization System," Computer Software and Applications Conference, Annual International, p. 621, 25th Annual International Computer Software and Applications Conference (COMPSAC'01), 2001.
Helfman, J. and Hollan, J.: Image Representations for Accessing and Organizing Web Information. SPIE II (2001) pp. 91-101.
U.S. Appl. No. 12/018,622, Dec. 13, 2010, Office Action.
U.S. Appl. No. 12/031,340, Dec. 17, 2010, Office Action.
U.S. Appl. No. 12/036,948, Jan. 12, 2011, Office Action.
U.S. Appl. No. 12/031,389, Jan. 18, 2011, Office Action.
U.S. Appl. No. 12/037,700, Dec. 21, 2010, Office Action.
Marshall Kirkpatrick TechCrunch IReader Uses Semantic Analysis to Summarize Linked Pages, Feb. 20, 2007, 1 page.
Amr Awadallah Blog, "Google Evilness for Advanced Search Queries," Jun. 8, 2006, 3 pages.

* cited by examiner

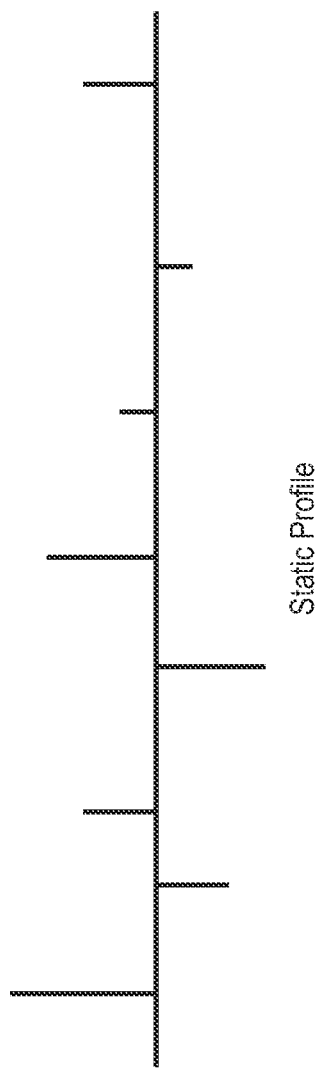

PERSONALIZATION TECHNIQUES USING IMAGE CLOUDS

CROSS-REFERENCE TO RELATED APPLICATIONS

This applications claims priority to and benefit from U.S. Provisional Patent Application Ser. No. 60/892,201, filed Feb. 28, 2007, and entitled "Active and Passive Personalization Techniques," which application is incorporated herein by reference in its entirety.

BACKGROUND OF THE INVENTION

Field of the Invention

The present invention relates to personalization of content. More particularly, the present invention relates to user interface techniques and active and passive personalization techniques to enhance a user's personalization experience.

Background

With more and more content being continually added to the world wide information infrastructure, the volume of information accessible via the Internet, can easily overwhelm someone wishing to locate items of interest. Although such a large source pool of information is desirable, only a small amount is usually relevant to a given person. Personalization techniques are developing to provide intelligent filtering systems to 'understand' a user's need for specific types of information.

Personalization typically requires some aspect of user modeling. Ideally, a perfect computer model of a user's brain would determine the user's preferences exactly and track them as the user's tastes, context, or location change. Such a model would allow a personal newspaper, for example, to contain only articles in which the user has interest, and no article in which the user is not interested. The perfect model would also display advertisements with 100% user activity rates (i.e., a viewer would peruse and/or click-through every ad displayed) and would display only products that a user would buy. Therefore, personalization requires modeling the user's mind with as many of the attendant subtleties as possible. Unfortunately, user modeling to date (such as information filtering agents) has been relatively unsophisticated.

However, personalization content as well as profiles can be difficult for users to digest, especially where such content is dispersed through a web page that often requires a large amount of scrolling. Furthermore, developing a personalization profile can be cumbersome and time consuming. Fill-in profiles represent the simplest form of user modeling for personalization technology. A fill-in profile may ask for user demographic information such as income, education, children, zip code, sex and age. The form may further ask for interest information such as sports, hobbies, entertainment, fashion, technology or news about a particular region, personality, or institution. The fill-in profile type of user model misses much of the richness desired in user modeling because user interests typically do not fall into neat categories.

Feature-based recommendation is a form of user modeling that considers multiple aspects of a product. For example, a person may like movies that have the features of action-adventure, rated R (but not G), and have a good critic review of B+ or higher (or 3 stars or higher). Such a multiple-feature classifier such as a neural network can capture the complexity of user preferences if the interest is rich enough. Text-based recommendation is a rich form of feature-based recommendation. Text-based documents can be characterized using, for example, vector-space methods. Thus, documents containing the same frequencies of words can be grouped together or clustered. Presumably, if a user selects one document in a particular cluster, the user is likely to want to read other documents in that same cluster.

However, it would be advantageous to provide a user with a personalization experience that generates positive perceptions and responses that encourage users to want to use the personalization service, while avoiding those negative perceptions that would discourage users from using the system, in an unintrusive manner so that the user can view content in a manner with which they are already familiar. Positive perceptions from the point of view of a user include, easily developing a profile, easily viewing third party profiles, and easily viewing potentially interesting content.

BRIEF DESCRIPTION OF THE DRAWINGS

To further clarify the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 2A and 2B illustrate an exemplary user interface displaying an image cloud used to display recommended content to a user for an exemplary personalization service.

FIG. 5A illustrates an exemplary user interface displaying an image cloud used to display search content to a user for an exemplary personalization service.

FIG. 12 illustrates an exemplary profile.

INTRODUCTION

Figure 1:
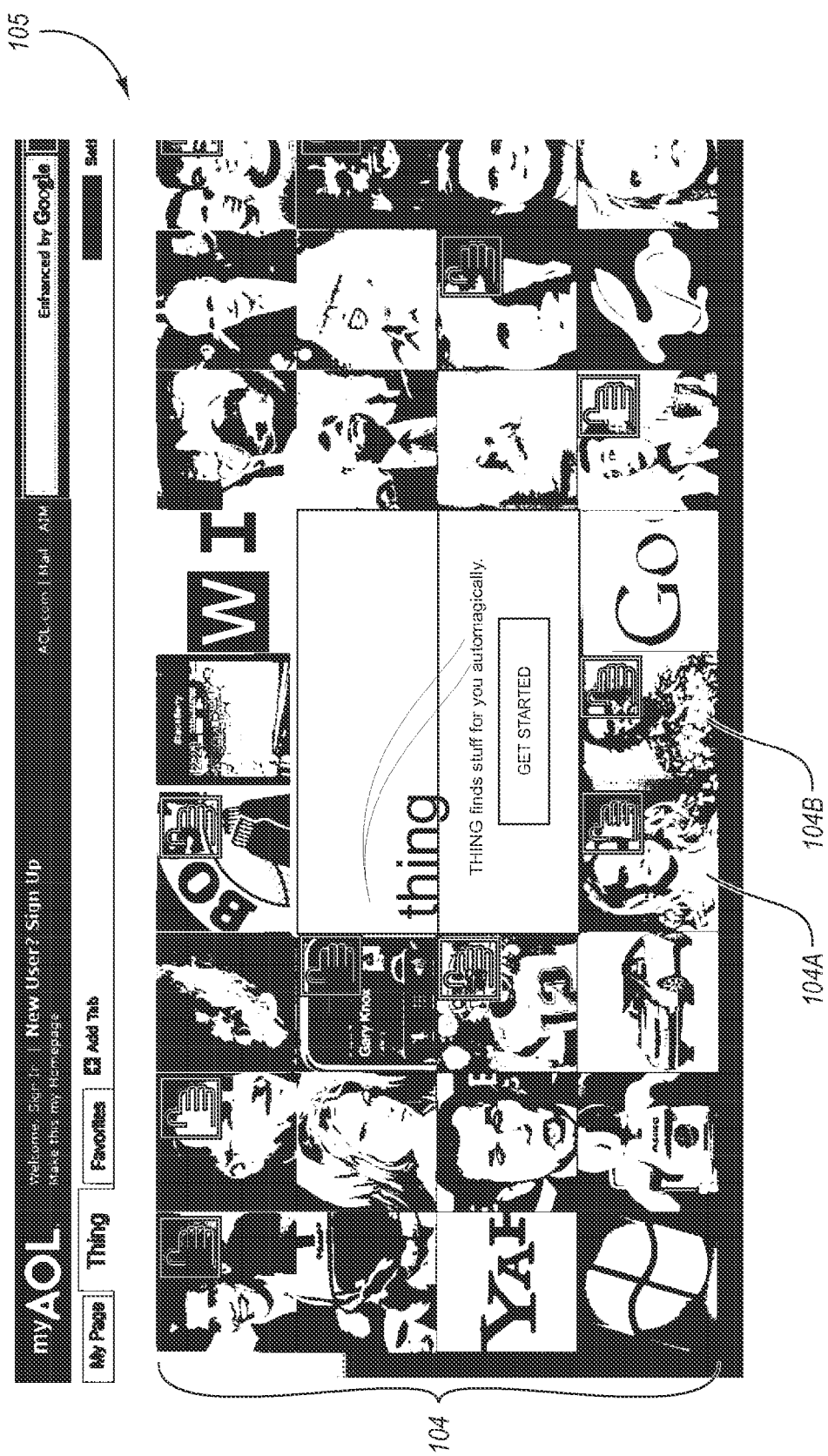
FIG. 1 illustrates an exemplary user interface displaying an image cloud used to obtain initial interests of a user for an exemplary personalization service.

The present invention relates to using the concept of "personalization" in a computer network environment to deliver the most relevant possible experiences to customers, driving significant factors such as customer satisfaction and customer loyalty. Embodiments of the present invention contemplate a layered, portable, personalization platform that can present various personalized content sources including, but not limited to: (1) portal to access web services; (2) feeds and favorites; (3) recommended content; (4) network and channel content promotions; (5) search results; (6) advertisements; and (7) social networks. One benefit of the present invention is that it eliminates the requirement for a user to actively seek feed sources or to mark favorites in order to provide the user with personalized content. The present invention automatically identifies relevant content based on the personalization techniques presented herein. While the focus of the present invention is to provide personalized content to a user, embodiments may also be coupled with customizable features to provide even more customer satisfaction and customer loyalty. Aspects of the user interface for the personalized platform will first be described, following which will be details relating to the implementation of personalization techniques, including the underlying system of the platform.

DEFINITIONS

The following provides various definitions that will assist one of skill in the art to understand the teachings of the present invention. It should be understood that the terms are intended to be broadly construed rather than narrowly construed.

Entity: any user or content item that can be characterized as having an "interest." Examples of an entity include a person, article, image, web page, movie clip, audio clip, feed, promotion, and the like.

User: any person or entity. In some cases, the "user" can be represented by a screenname or other anonymous identifier. A known user (whose identity is known) and an anonymous user (who can be identified through tracking technology) can have Profiles. An opt-out user is one who has affirmatively elected to opt-out of having an Profile identified for that user. However, an opt-out user can still have access to certain personalization features of the present invention.

Content item: any information that can be displayed or played (e.g., audio file or multimedia file) on a communication device operated by a user.

Feature: generally, a word or textual phrase used to describe an entity. E.g. "football", "baseball", "San Francisco", "bring", etc. The concept of a feature is not limited to such phrases and can be extended to represent such things as a category, the source of a feed, the colors of icons, the existence of images in a story, etc.

Feature set or Feature vector: a set of features associated with an entity.

Interest: the weighted importance of a feature. E.g., baseball can have twice the weighted value as football. There are both positive and negative interests weightings. They can represent like/dislike (a person likes football and dislikes baseball). An interest can be based on a number of factors such as the number of times a feature appears in an article, the user's exhibited interest or lack of interest in a feature, etc.

Interest set or Interest vector: a set of interests associated with an entity.

Profile: a set of feature vector(s) and/or interest vector(s) associated with an entity.

Composite Profile: two or more Profiles combined to generate content based on the combination of the two or more Profiles Passive: gathering information about an entity by transparently monitoring its activities.

Active: gathering information about an entity by having the entity knowingly express likes and dislikes.

Positive: gathering information about an entity in response to positive user interest.

Negative: gathering information about an entity in response to negative user interest.

Static Entity: An entity whose Interest Vector does not change over time

Dynamic Entity: An entity whose Interest Vector change over time and could have multiple "snapshots" of Interest Vectors based on context/time.

Image Clouds for Presenting Personalized Content

FIGS. 1 through 5 illustrate various aspects of a content recommendation service 100 that includes various interfaces that present content to a user and through which a user is able to interact, and that uses passive and active personalization to provide a user with personalized content. Optionally, although not shown, the content recommendation service may initially display an entrance page briefly describing the recommendation service and providing an entrance link.

Upon entering the recommendation service 100, as shown in FIG. 1, the user is presented with a bootstrap image cloud 105 having a plurality of initial images 104. In one embodiment, the images 104 may be determined and presented based on known user demographics and/or user interests, such as from a fill-in type survey. The images 104 may also be selected based on past searches, past browsing history, past purchases, and the like, previously performed by the user. If user demographics, user interests, or other user activity is not known, the images 104 may be selected from a pool of 'popular' images or a set of images that represent various broad categories to try to identify user interests.

A user is able to select one or more of the images 104 in the bootstrap image cloud 105 to indicate his interest in receiving more content related to the category or subject matter of the image. Advantageously, the bootstrap image cloud 105 with initial images 104 provides a way to seed the recommendation system with initial user interests. The initial image cloud 105 essentially acts as a conversation starter between the user and the recommendation system that is much easier, more appealing and enjoyable to use than traditional lengthy fill-in type survey forms. As shown in FIG. 1, the user selects one or more images 104A, 104B, as indicated by the "thumbs up" icon on these images and any others the user feels compelled to select, which the recommendation service (described below) will use to automatically find content personalized to that user.

FIG. 1 introduces the concept of an "image cloud" that will be referred to at various times throughout this disclosure. An image cloud enables the user or a third party to easily capture content of interest to the user or third party in a visually appealing manner as well as conveying a large amount of information than could be conveyed using simple text. As shown in FIG. 1, the images in the image cloud are grouped and displayed adjacent or in close proximity with each other in one predefined area. The placement of the images minimizes content such as text, spacing or other content, between the images. Thus, an image cloud visually represents information in the form of images in a manner that a user or other third party can easily comprehend the images. Such information that can be visually represented by an image cloud may be a bootstrap method, user profile, recommendations, popularity (what's hot) content, search results, and the like. This enables a user or third party to view and/or select images in the image cloud without requiring a user or other third party to use extensive navigation methods to find images, such as scroll bars, excessive mousing movements, extensive window resizing, or the like. Thus, the image cloud also minimizes the navigation methods required to locate the plurality of images representing visually representing information of interest.

The term "bootstrap" is appended before the term "image cloud" simply to describe one embodiment of using image clouds to assess initial user interests. However, the term bootstrap should not be construed as limiting in any way to the scope of the present invention. Furthermore, while the drawings show the bootstrap image cloud as having images of the same size located in an array, the size, shape, and/or placement of the images can vary based on design considerations. While one advantage of the present invention is to attempt to minimize the amount of content located between the image clouds, it will be appreciated that the present invention also encompasses variations of image clouds that include a minimal amount of text between and/or overlapping the images of the image clouds.

In one embodiment, each image in the bootstrap image cloud 105 relates to a particular category or channel, such as, but not limited to, politics, elections, world, business/finance, sports, celebrities, movies, food, home, fashion, health, real estate, gaming, science, automobiles, architecture, photography, travel, pets, and parenting. An example of this embodiment is where an image represents "politics," and displays the President of the United States to visually represent politically-related content. In one embodiment, hovering over an image causes a descriptor to appear specifying the particular category. The categories can be broad or narrow. Content displayed in response to selection of a category image may produce content based on popularity and may not necessarily correspond with the image itself. In other words, selecting an image of the President of the United States may produce feeds related to the most popular current political issues and on a particular day may not necessarily be related to the President of the United States. In this situation, the image of the President of the United States is used symbolically to represent a category since the President is a well-known political figure.

In another embodiment, the initial images can relate to a particular interest (described below) describing the subject matter specific to the image. In this example, the image of the President of the United States may actually visually represent actual content related specific to the President of the United States rather than to the category of politics. As discussed below, where features are assigned to a particular image, interests can also be assigned. Selection on this type of image produces feeds related specifically to the image itself because the feature vector(s) and/or interest vector(s) (i.e., Profile described below) is used to identify content specifically related to the Profile of the image is produced. In addition, the Profile can be used to further tailor presentation of content based on concepts of sameness and importance, described below. Thus, selection of the image displaying the President of the United States would produce feeds related specifically to the President of the United States.

As will be discussed below, when a request is received to generate an image cloud, the personalization system accesses an image bank to match images based on category or features/interests. The personalization system also accesses a content bank to access other content, such as feeds, articles, etc., that relate to the category or features/interests identified by the user. The images can further be associated with features/interests so that when a user selects a particular image, the personalization system generates content related to the image. Images can also contain a link that redirects users to a content provider website.

Figure 2A:
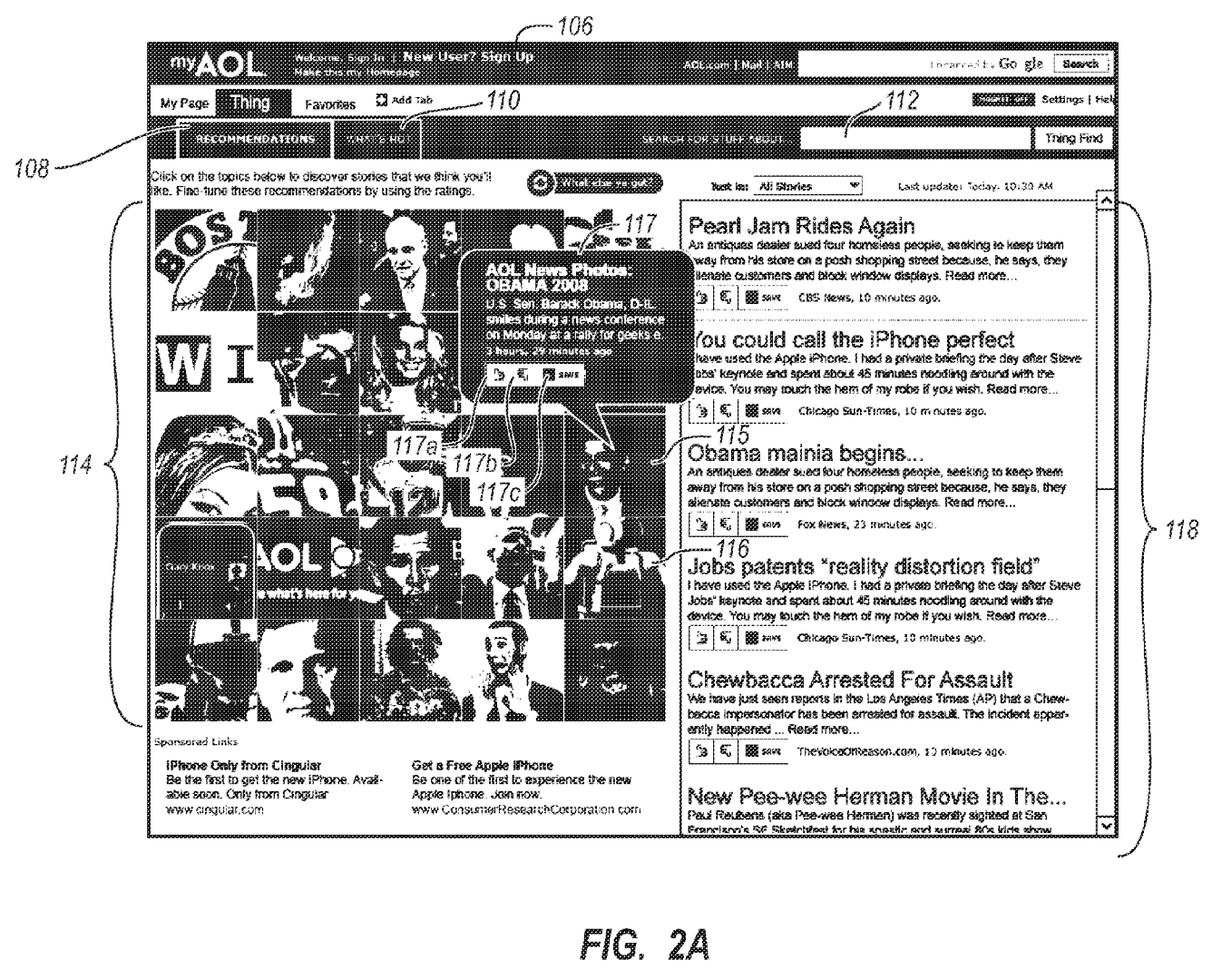

FIG. 2A illustrates another aspect of the recommendation service after the user has initially seeded her interests, for example, using bootstrap image cloud 105. In one embodiment, FIG. 2A illustrates a recommendations page 106 that is accessible via a tabulation 108. In addition, tabulation 110 can be used to select a popularity page and field 112 can be used to perform a search.

Recommendations page 106 includes image recommendations 114 that pictorially depicts a user's interests via images such as images 115, 116. For example, images 115 and 116 visually depict topics or persons that the user has expressed interested in. The collection of image recommendations 114 will also be referred to herein as a "recommendation image cloud." Advantageously, a recommendation image cloud provides a snapshot view of the content that is currently available based on the current interests of a user. Preferably, these images also relate to content that the user will most likely be interested in. Recommendations page 106 may also include recommendations in the form of text recommendations 118. This can also be referred to as an "inbox" of recommended current content that the user is most likely interest in. Text recommendations 118 include feed content related to the topics or personalities that may or may not be linked to images displayed in the recommendation image cloud 114. Selecting a text recommendation may provide various types of feed content, such as, but not limited to, articles, web pages, video clips, audio clips, images, and the like.

FIG. 2A illustrates that images in image recommendations 114 and feed content in text recommendations 118 relate to the original selections of the user from the bootstrap image cloud 105. In one embodiment, a user can review the image recommendations 114 and affirm or change what is presented to the user. User input can also affect what appears in text recommendations 118. For example, as shown in FIG. 2A, when a user hovers over an image 115, a user interest icon 117 is displayed. User interest icon 117 can display a brief abstract of the content associated with the image 115. User interest icon 117 displays a "thumbs up" approval 117a, "thumbs down" disapproval 117b, and a noncommittal "save" selection 117c. A user can select one of these options to express approval, disapproval, or not commit to a certain image. These types of input from a user are referred to as "active" input. As will be discussed in further detail below, a user's interests can be weighted based on this active input as well as other types of user-expressed interest. A selection of "save" 117c may be considered as a "soft like". In other words, a "save" may not be given the same weight as a "thumbs up" but still may be given some small weighting since the user has expressed enough interest to save the image for later consideration.

Figure 2B:
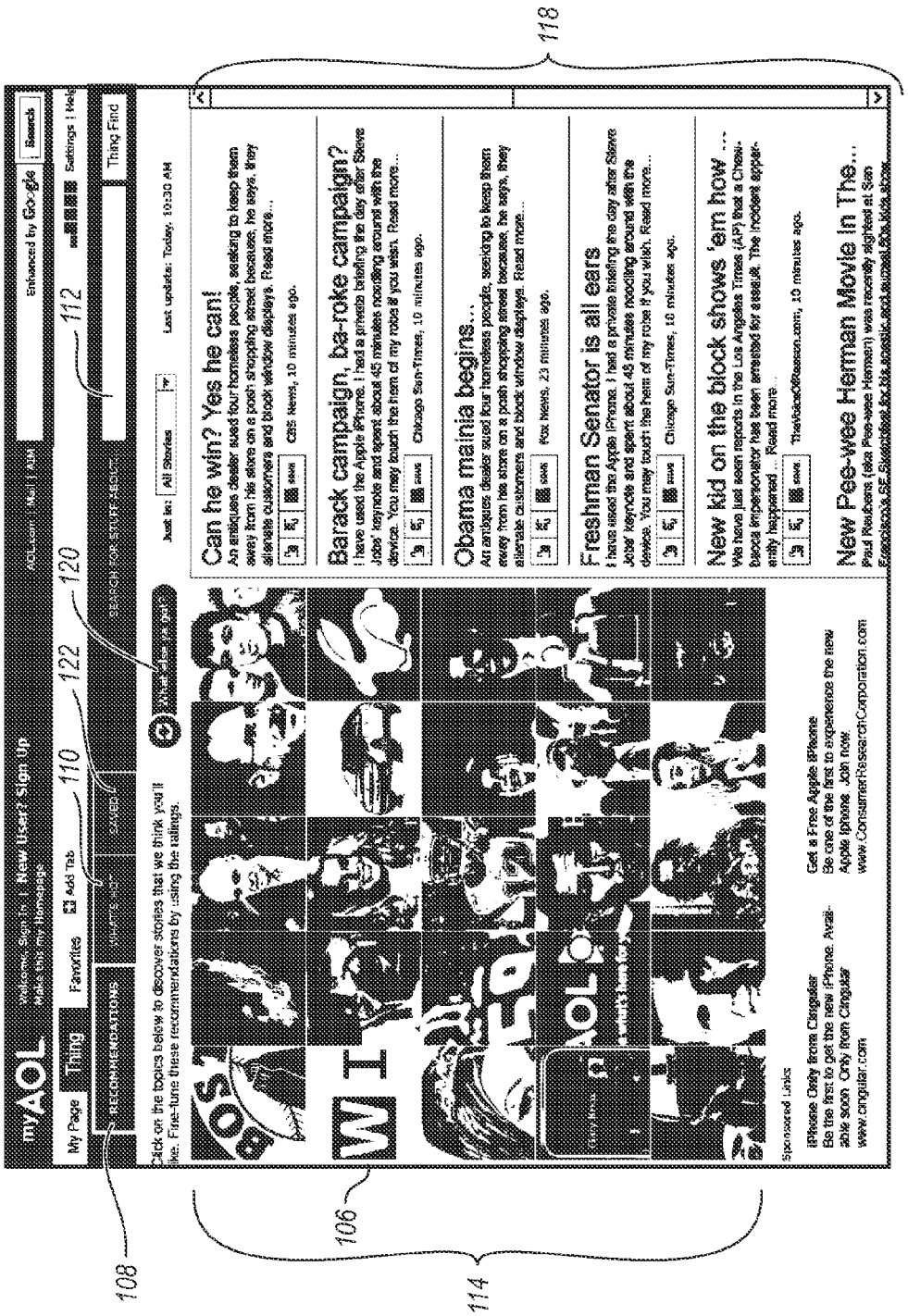

FIG. 2B illustrates a page that is presented to the user after the user has selected a "thumbs up" 117a on the user interest icon 117. FIG. 2B also illustrates an embodiment where the images 115 in image recommendations 114 are not linked to the feeds displayed in text recommendations 118. In the text recommendations 118, the abstracts have changed to reflect feed content related to the specific image 115 that the user has selected. FIG. 2B also illustrates that the user can return to content related to the other images 114 by selecting a refresh icon 120. Anytime refresh icon 120 is selected, the system understands this to be a general request for different content from the recommendation engine. When this icon 120 is selected, the recommendation system is refreshed to provide the most current information that relates to the user's interests. A "saved" icon 122 can also be used to restore images that had previously been saved by the user for consideration from selection such as "saved" 117c selection depicted in FIG. 2A.

As mentioned above, in one embodiment, the text recommendations 118 and image recommendations 114 may also be interlinked. For example, a user can hover over an image 115 and a popup abstract 117 containing a summary of the feed content related to that image. Selecting the image 115 causes one or more feed content in text recommendations 118 relating to that image to be highlighted (such that a user can easily find specific feed content related to that image). As described below in further detail, the present invention includes methodologies for personalizing the image recommendations 114 and/or text recommendations 118 using active and passive personalization techniques.

Figure 3A:
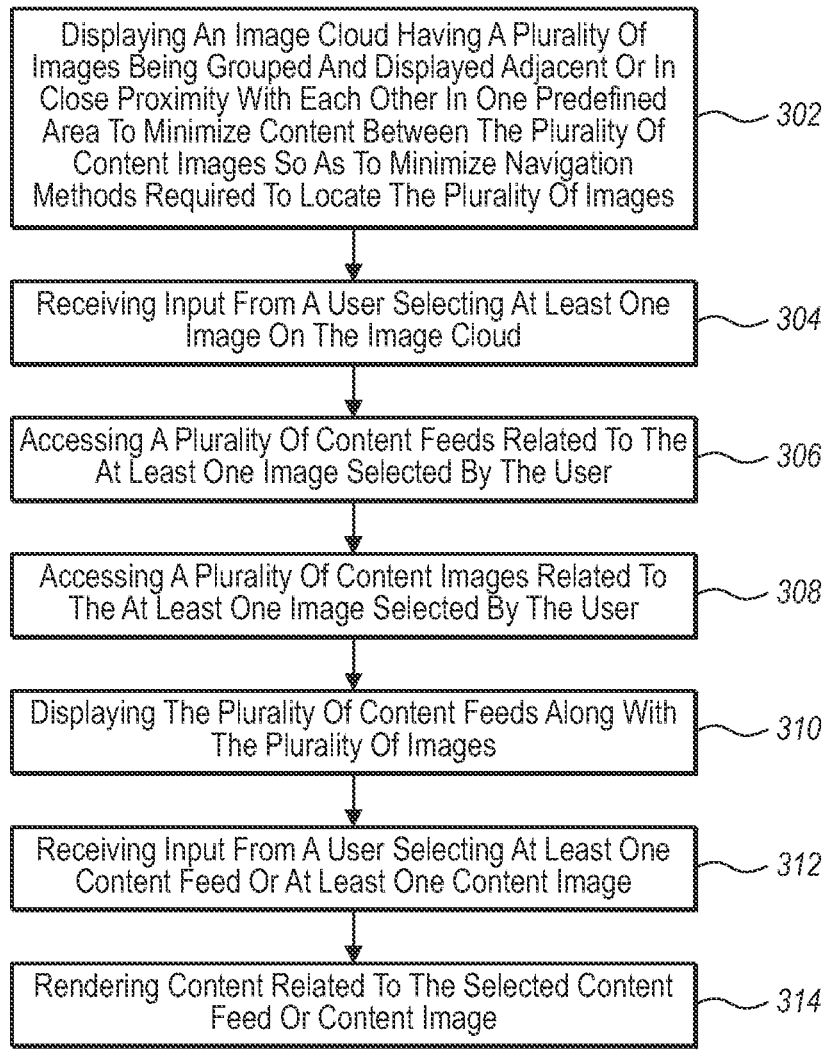
FIG. 3A illustrates an exemplary method for using an image cloud to obtain initial interests of a user.

Thus, FIGS. 1, 2A and 2B illustrate exemplary screen shots that can be initiated using a bootstrap image cloud. FIG. 3A illustrates an exemplary method for personalizing content for a particular user using an image cloud, the method including, at 302, displaying a image cloud having a plurality of images being grouped and displayed adjacent or in close proximity with each other in one predefined area to minimize content between the plurality of content images so as to minimize navigation methods required to locate the plurality of images. An example of the bootstrap image cloud is depicted in FIG. 1, although various ways of arranging the images in the bootstrap image cloud are possible within the broad scope of the definition of a bootstrap image cloud and consistent with the teachings herein.

Further, the images in the bootstrap can represent different ideas. For example, as discussed above, each of the images in the bootstrap image cloud can be associated with a category, with each of the images representing a different category. Alternatively, each of the images in the bootstrap image cloud can be associated with an interest and interest set based on actual content of the image.

The method includes, at 304, receiving input from a user selecting at least one image on the image cloud, at 306, accessing a plurality of content feeds related to the at least one image selected by the user (e.g., based on the category or feature/interests associated with the image), at 308, accessing a plurality of content images related to the at least one image selected by the user, at 310, displaying the plurality of content feeds along with the plurality of images. The method can further include, at 312, receiving input from a user selecting at least one content feed or at least one content image, and at 314, rendering content related to the selected content feed or content image. The bootstrap image cloud thus serves as a means for obtaining an initial understanding of user interests to be able to present content that is more likely to be of interest to the user.

Of course it will be appreciated that once a user seeds her interests using, for example, bootstrap image cloud (FIG. 1) or subsequent use of the recommendations page (FIG. 2A), that a user can access the recommendation service 100 directly through the recommendations page 106 without having to go to the bootstrap image cloud again. However, a user is always free to restart the recommendation service and go back through the bootstrap image cloud, if desired.

Figure 3B:
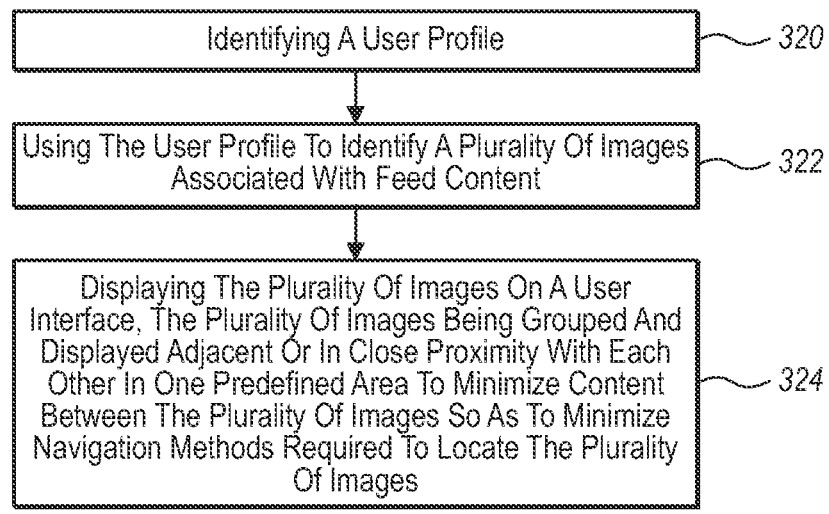
FIG. 3B illustrates an exemplary method for using an image cloud to display recommended content to a user.

FIG. 3B depicts an exemplary method for personalizing content for a particular user using a recommendation image cloud, the method including, at 320, identifying a user profile, at 322, using the user profile to identify a plurality of images associated with feed content, and, at 324, displaying the plurality of images on a user interface, the plurality of images being grouped and displayed adjacent or in close proximity with each other in one predefined area to minimize content between the plurality of images so as to minimize navigation methods required to locate the plurality of images. When a user positively selects an image, feed content associated with the image can be displayed. As mentioned above, if the image and feed content are both already displayed, selecting the image may highlight the associated feed content. In any case, when a user positively or negatively selects an image, the user profile can be updated accordingly.

In one embodiment, the bootstrap image cloud can be used to develop a user profile, described in further detail below. In embodiments where the bootstrap image is related to categories, the category can be added as a feature to a user profile and affect an associated interest of the user profile. In embodiments where the bootstrap image has associated profile of feature vector(s) and/or interest vector(s), the feature vector(s) and/or interest vector(s) of the bootstrap image can be used to start or update a user profile.

Figure 4A:
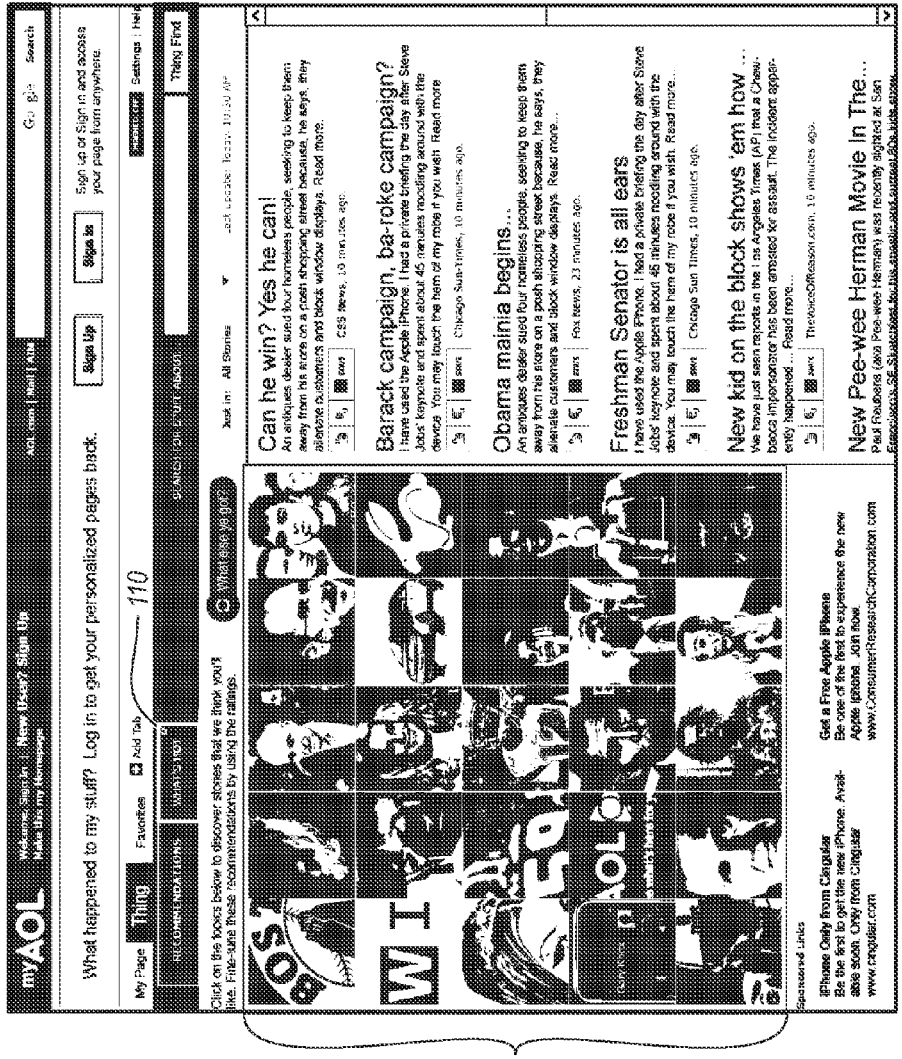
FIG. 4A illustrates an exemplary user interface displaying an image cloud used to display popular recommended content to a user for an exemplary personalization service.

Turning to FIG. 4A, "what's hot" tabulation 110 has been selected to present a popularity content page 130 that provides additional content to a user based on popularity. Popularity can be based on various demographics including, but not limited to, what's popular in the user's social network, what's popular in a geographic region (whether globally, nationally, regionally, and/or locally), or what is popular with users of a particular gender, race, age, religion, interests, and the like. Popularity can be measured by number of views, rankings, number of comments, and the like, among the defined demographic. The default demographic can be based on what is popular for the country in which the user resides. The image popular content 132 and text popular content 134 can operate substantially similar to the image and text recommendations 114, 118 of FIG. 2B.

Figure 4B:
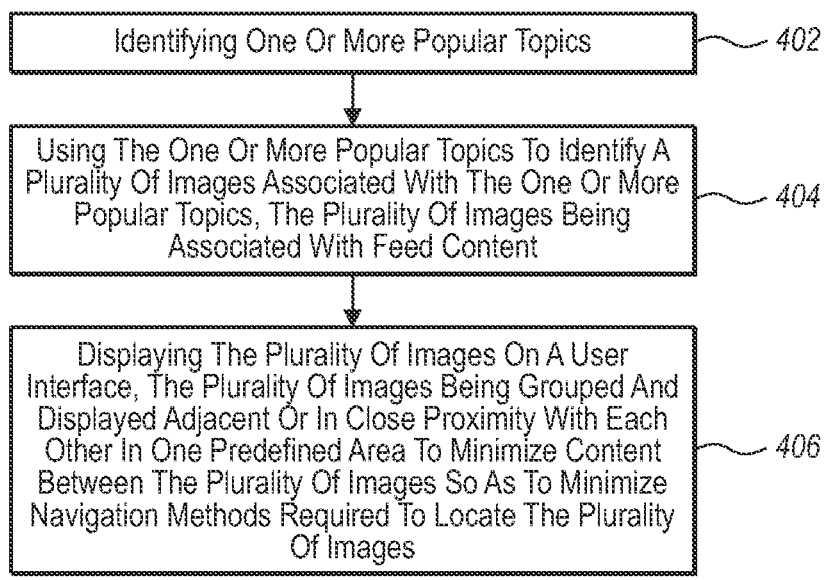
FIG. 4B illustrates an exemplary method for using an image cloud to display popular content to a user.

FIG. 4B depicts an exemplary method for personalizing content for a particular user using a popularity image cloud, the method including, at 402, identifying one or more popular topics, at 404, using the one or more popular topics to identify a plurality of images associated with the one or more popular topics, the plurality of images being associated with feed content, and at 406, displaying the plurality of images on a user interface, the plurality of images being grouped and displayed adjacent or in close proximity with each other in one predefined area to minimize content between the plurality of images so as to minimize navigation methods required to locate the plurality of images.

Figure 5A:
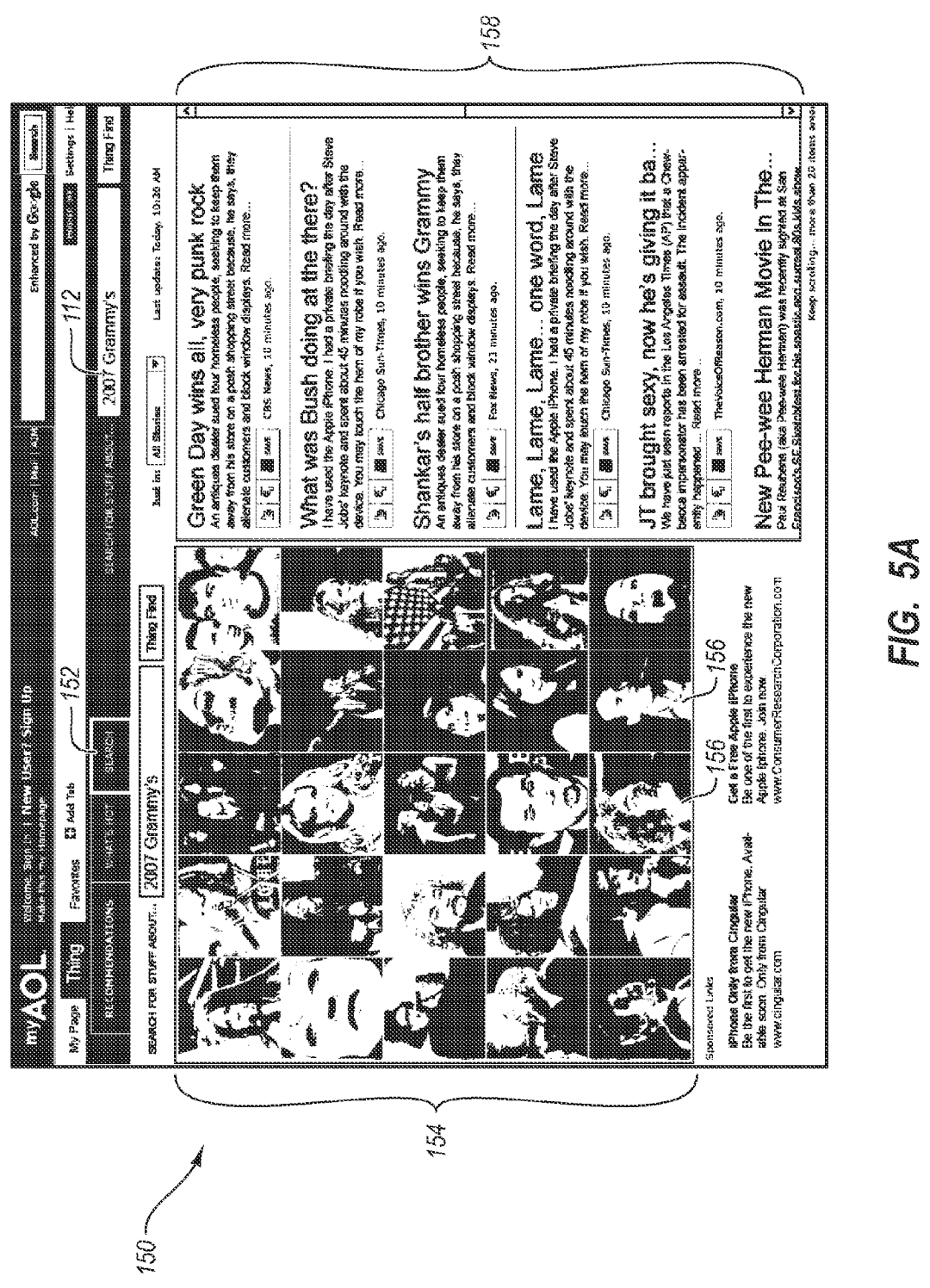

FIG. 5A illustrates a search page 150 that can be accessed, for example, by selecting tabulation 152. The search results page 150 includes a search field 112 that a user can use to find content of interest. Like the recommendation page, search results on the search page 150 can be displayed by an image search results 154 that pictorially displays the search results in the form of images, such as 156. The search images can also be referred to as a "search image cloud." Search results page 150 may also include search results in the form of text search results 158. Image search results 154 and text search results 158 can operate substantially similar to image and/or text recommendations 114, 118 of FIG. 2B.

Figure 5B:
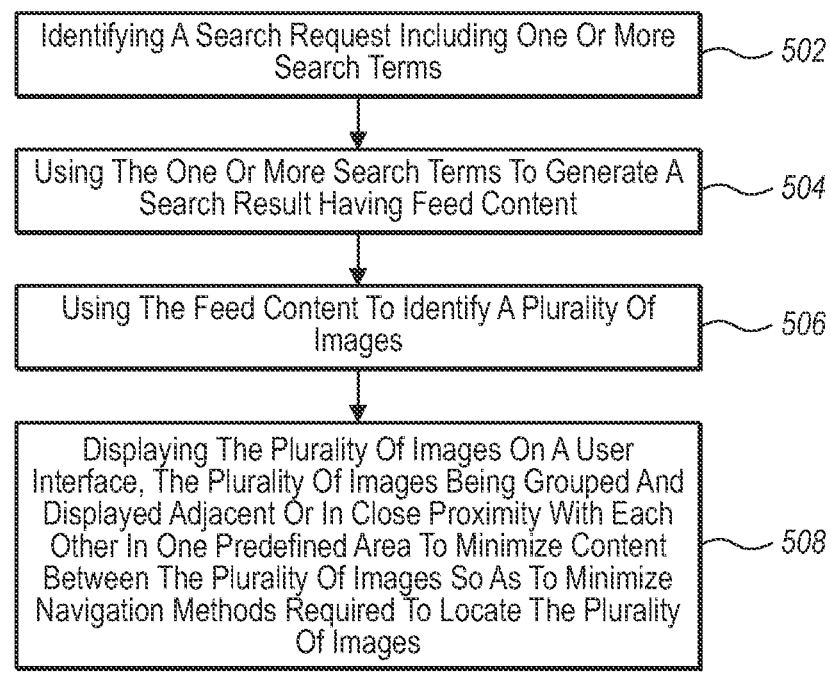
FIG. 5B illustrates an exemplary method for using an image cloud to display search content to a user.

FIG. 5B depicts an exemplary method for personalizing content for a particular user using a search image cloud, the method including, at 502, identifying a search request including one or more search terms, at 504, using the one or more search terms to generate a search result having feed content, at 506, using the feed content to identify a plurality of images, and at 508, displaying the plurality of images on a user interface, the plurality of images being grouped and displayed adjacent or in close proximity with each other in one predefined area to minimize content between the plurality of images so as to minimize navigation methods required to locate the plurality of images.

Advantageously, providing the bootstrap image cloud 105, recommendations page 106, popularity page 130, and/or search page 150 using image content and/or text content, provides various sources of content that allows a user or third person (i.e., visitor) to visually see what is or potentially could be important to a user to better personalize recommendations and searches to a user. User interaction with any of these sources affects a user profile, which, in turn, affects subsequent content that is presented to the user. For example, when a user interacts with the popularity page 130 and search page 150, such interaction affects content presented on the recommendations page 106. Of course, other ways of recommending and obtaining user interest activity can be implemented in combination with one or more of these types of content delivery. For example, a wild card page could be added that allows a user to simply view an assortment of random content to see if any of the random content catches the user's interest. Or, the user could access a topographical page that lists any number of potential interests by alphabetical order. Similar to the initial images 104, the user could select on any of these images and/or text results which would provide additional information to personalize content for a user.

It will be appreciated that the image cloud/text content paradigm may be used in other contexts other than recommendations, popularity, and search results. For example, this same paradigm could extend to channel based content and programming. In one embodiment, a commerce service might have a page specifically directed to real estate. When a user accesses the real estate page, potential real estate recommendations can be presented to the user based on, among other things, the user's personalization profile. Thus, potential real estate content is matched up with user interests for that particular content page, presenting properties in an image cloud and presenting text recommendations about properties, schools, or other aspects of that geographical area.

In another example, a page about a particular topic can be programmed to present an image cloud and text content based on one or more users' interest in that topic. In contrast to a standard dynamic web page that displays preprogrammed images and text about a topic, a community generated page is actually built from what one or more user profiles that have a current interest in the topic as opposed to what an editorial publisher 'thinks' readers are interested in. Thus, the community-generated page will dynamically change as the interests of the community changes.

The content presented to a user can depend on the classification of the user. For known users and anonymous users, the personalization attributes of the recommendations page 106, popularity page 130 and search page 150 will be fully functional based on the user's profile. However, for opt-out users where a user profile is unavailable, other mechanisms are used to provide content for the popularity page 130 and search page 150 so that they appear to have personalization attributes.

Social Interactivity

The present invention allows for various levels of social interactivity with regard to active and passive personalization. The above describes providing bootstrap, recommended, popular, and searched content in the form of image clouds and/or text based on a user's interests. Another way to view a user's interests is to view a user profile. FIGS. 6A through 12 illustrate various aspects of social interactivity that can occur through displaying a user's and other third party profiles.

Figure 6A:
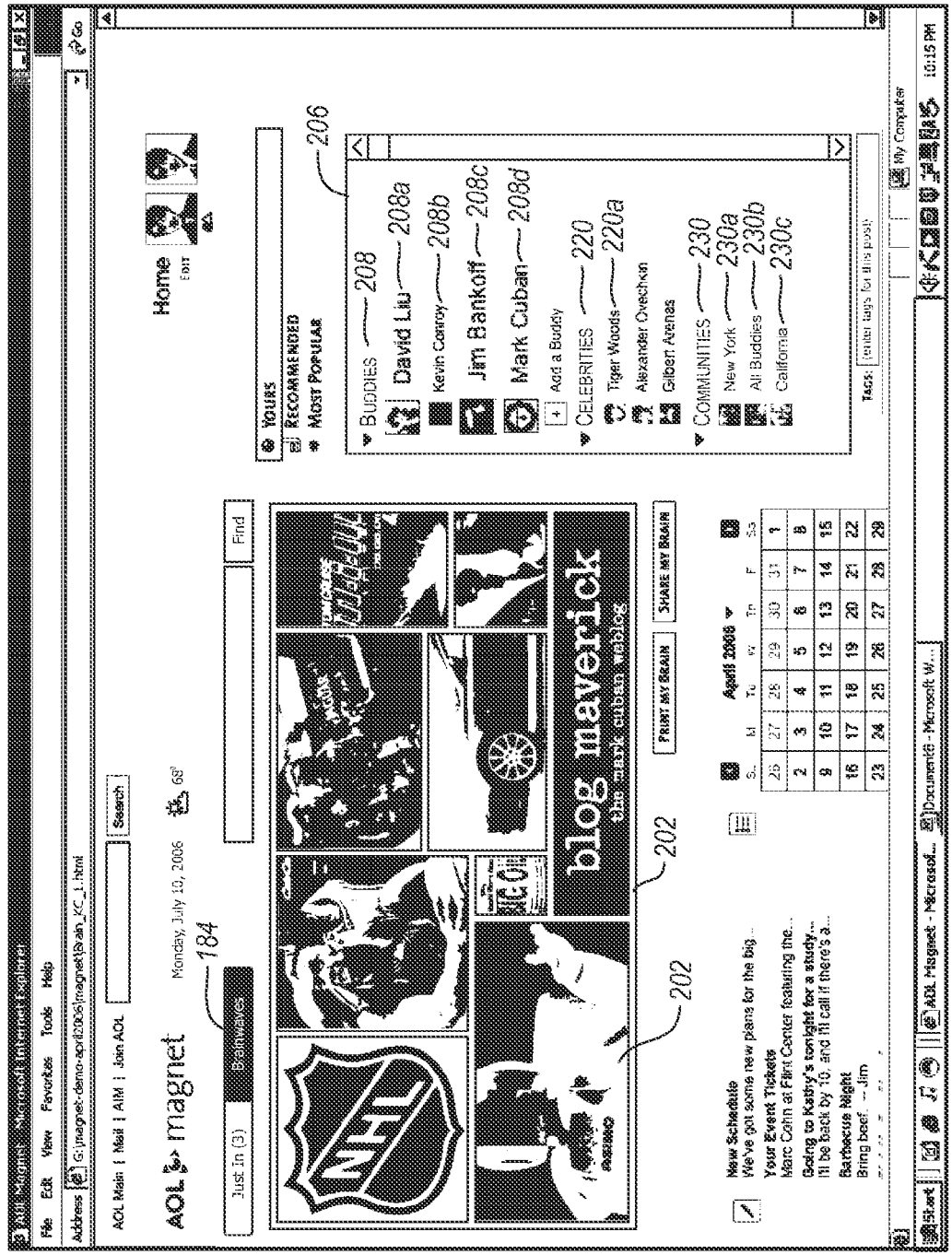
FIG. 6A illustrates an exemplary user interface displaying a profile image cloud.

Besides directly accessing a user profile page, the user can access her profile while in other content areas of the site. For example, as the user is interacting with the dynamic aspects of the recommendation page described above, a social network icon (not shown) can be located in various content areas of the personalization service to allow a user to be directed to her user profile. As shown in FIG. 6A, a user's personalization page may have a user profile, denoted as "brainwaves" tab 184 that redirects the user to her own profile image cloud.

As shown in FIG. 6A, profile image cloud 200 depicts a user's interests pictorially via one or more images 202. The difference between images 202 of FIG. 6A and images 114 of FIG. 2B is that in the profile image cloud, the images 202 are not necessarily tied to feeds that are currently available. That is, the images 202 visually represent a true depiction of a user's interests at that point in time. A profile image cloud enables the user or a third party to easily capture the user interests in a visually appealing manner as well as conveying a large amount of information than could be conveyed using simple text. The images in the profile image cloud are grouped and displayed adjacent or in close proximity with each other in one predefined area. The placement of the images minimizes content such as text, spacing or other content, between the images. Thus, a profile image cloud visually represents information about the user in the form of images in a manner that a user or other third party can easily comprehend the images. Such user information that can be visually represented by an image cloud includes information about topics or categories, brands, sports teams, activities, hobbies, TV shows, movies, personalities, or any other interest that can be visually depicted.

In addition to visually depicting a user's interests, the images in the profile image cloud are interactive which enables a user or third party to view and/or select images in the image cloud without requiring a user or other third party to use extensive navigation methods to find images, such as scroll bars, excessive mousing movements, extensive window resizing, or the like. Thus, the profile image cloud also minimizes the navigation methods required to locate and/or select the plurality of images visually representing information of interest about the user.

Figure 6B:
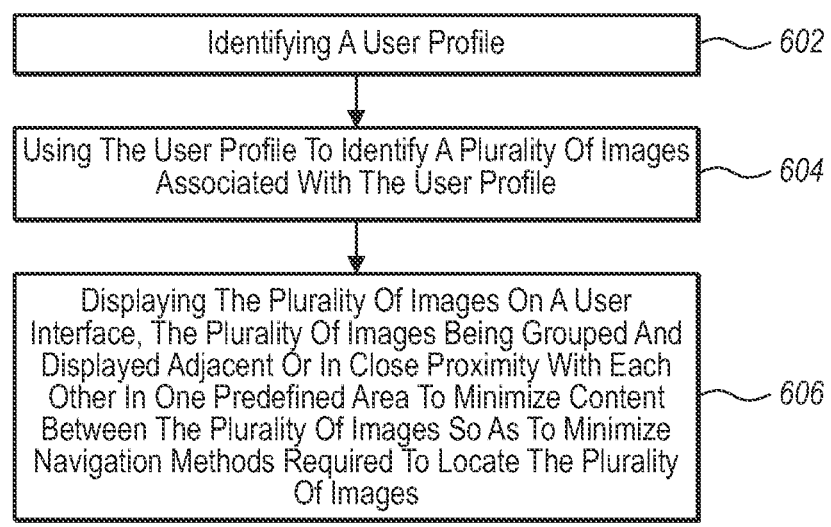
FIG. 6B illustrates an exemplary method for displaying a profile image cloud.

FIG. 6B depicts an exemplary method for personalizing content for a particular user using a user profile image cloud, the method including, at 602 identifying a user profile, at 604, using the user profile to identify a plurality of images associated with the user profile, and, at 606, displaying the plurality of images on a user interface, the plurality of images being grouped and displayed adjacent or in close proximity with each other in one predefined area to minimize content between the plurality of images so as to minimize navigation methods required to locate the plurality of images.

The size, shape and/or layout of the images in the user profile image cloud can vary based on design considerations. For example, not all images in an image cloud may have the same level of user interest. Profile image cloud 200 illustrates that images can be displayed in different sizes, which is one example of varying the display of images to reflect varying levels of interest (with larger sizing reflecting greater interest and smaller sizing reflecting less interest). In one embodiment, interest level can be based on how many of the features of an image match the features of a user profile.

The method further includes detecting a change in the user profile, selecting new images to be included in the plurality of images, and dynamically changing the display of the plurality of images with the selected new images in a manner substantially real-time with the detected change in the user profile. Thus, the profile image cloud can be refreshed as the user's profile and interests change. The user's profile can change based on active and passive personalization, as discussed below. Having image clouds that are interactive is one example of active personalization. The user can interact with her own user profile as well as the user profiles of other third parties, such as, but not limited to, buddies, celebrities, and communities, as will now be described.

FIG. 6A also illustrates a user's social network 206, which lists one or more buddy icons 208. As shown in FIG. 6A, the icons 208 related to each buddy may reflect how similar or dissimilar the buddy is to the user. Displaying buddies based on similarities/dissimilarities provides an interactive way for the user to identify with buddies in her social network. Buddy displays can be dynamically updated in real time so that the user can view how her buddies' interest compare to hers over time. While FIG. 6A shows that similarity/dissimilarity of buddies is shown by displaying icons 208 of different sizes (with larger size indicating more similarity and smaller size depicted less similarity), other methods can also be used including, but not limited to sizing, different iconic symbols, color, graphics, text, transparency, and the like.

Figure 7A:
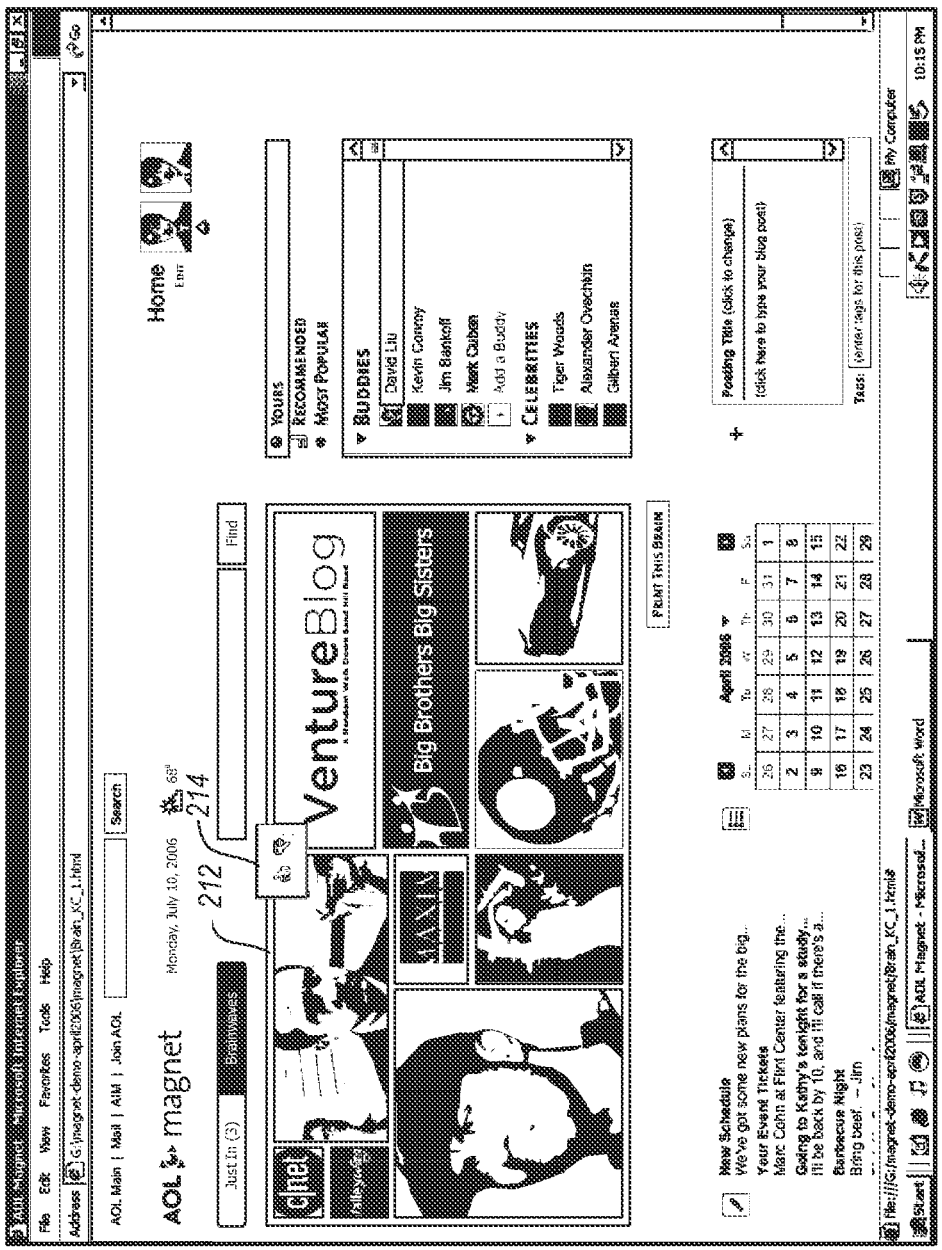
FIGS. 7A through 7D illustrate an exemplary user interface displaying a profile image cloud for three contacts of the user.
Figure 7B:
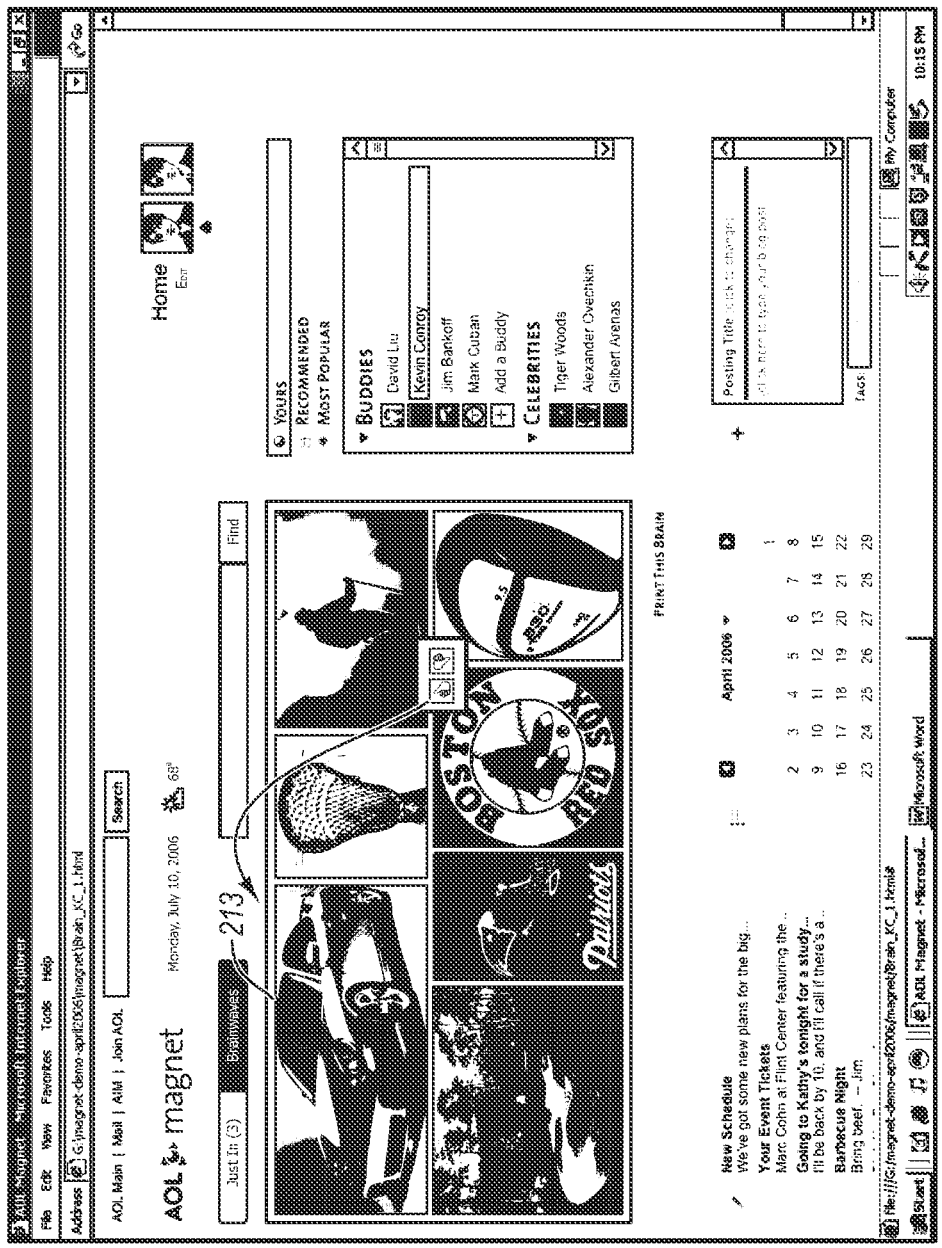
Figure 7C:
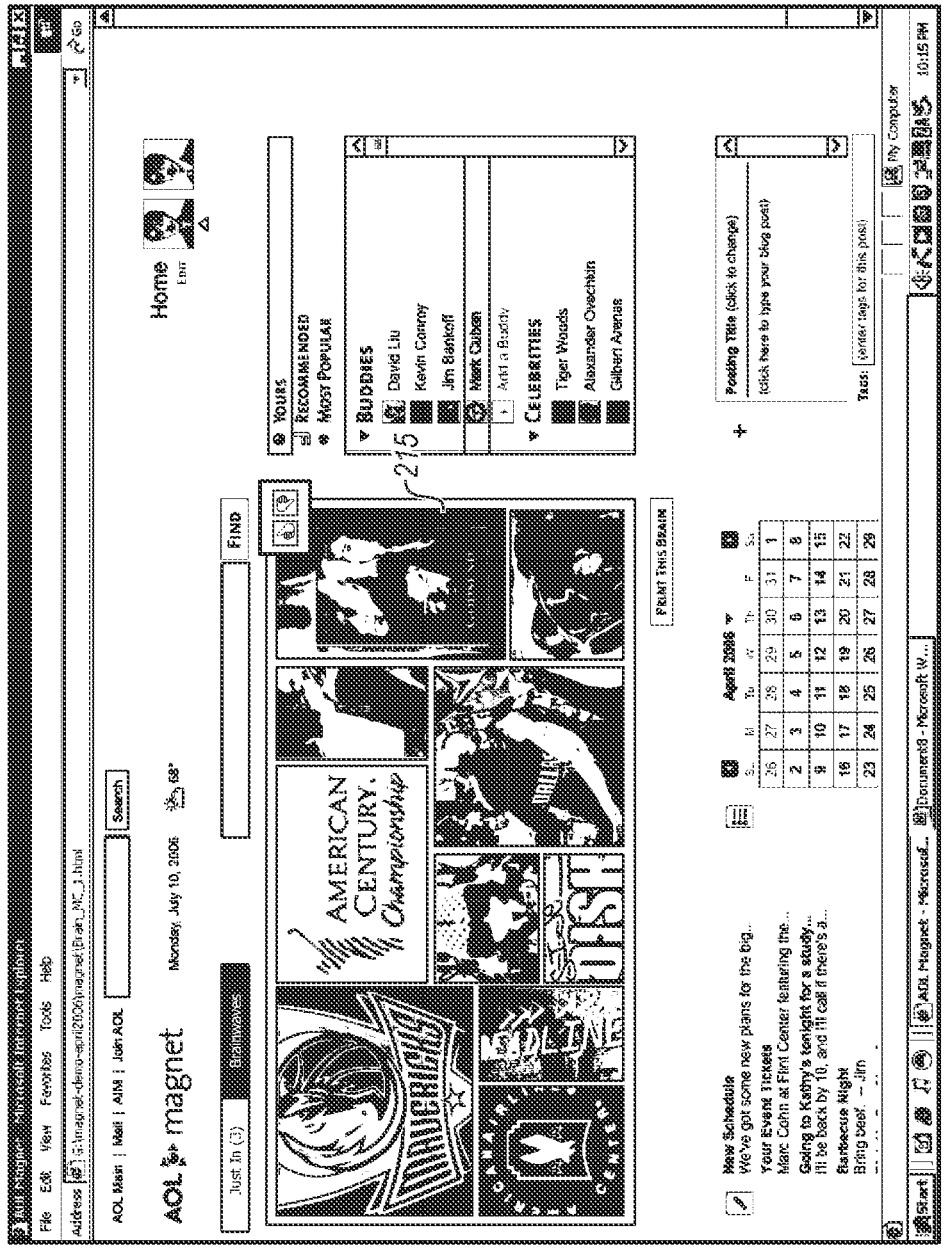

Upon selecting a first buddy 208a, as shown in FIG. 7A, the buddy's profile image cloud 210 is displayed containing images 212. A user is thus able to view the buddy's interests. For example, if it is nearing the buddy's birthday, the user may view a buddy's interests to get ideas for gifts. The user can also approve/disapprove of as many of the images 212 displayed in the buddy's profile image cloud as desired via a user interest icon 214 that appears when the user hovers over the image. FIG. 7A illustrates the user selecting image 212 for buddy 208a. The user can also select image 213 for buddy 208b as shown in FIG. 7B and image 215 for buddy 208d as shown in FIG. 7C. In other words, the user can view and/or comment on the images in any of her buddy's profile image clouds. Advantageously, this provides a simple, visually appealing method for allowing a user to view, adopt, and/or disagree with their friends' interests.

Figure 7D:
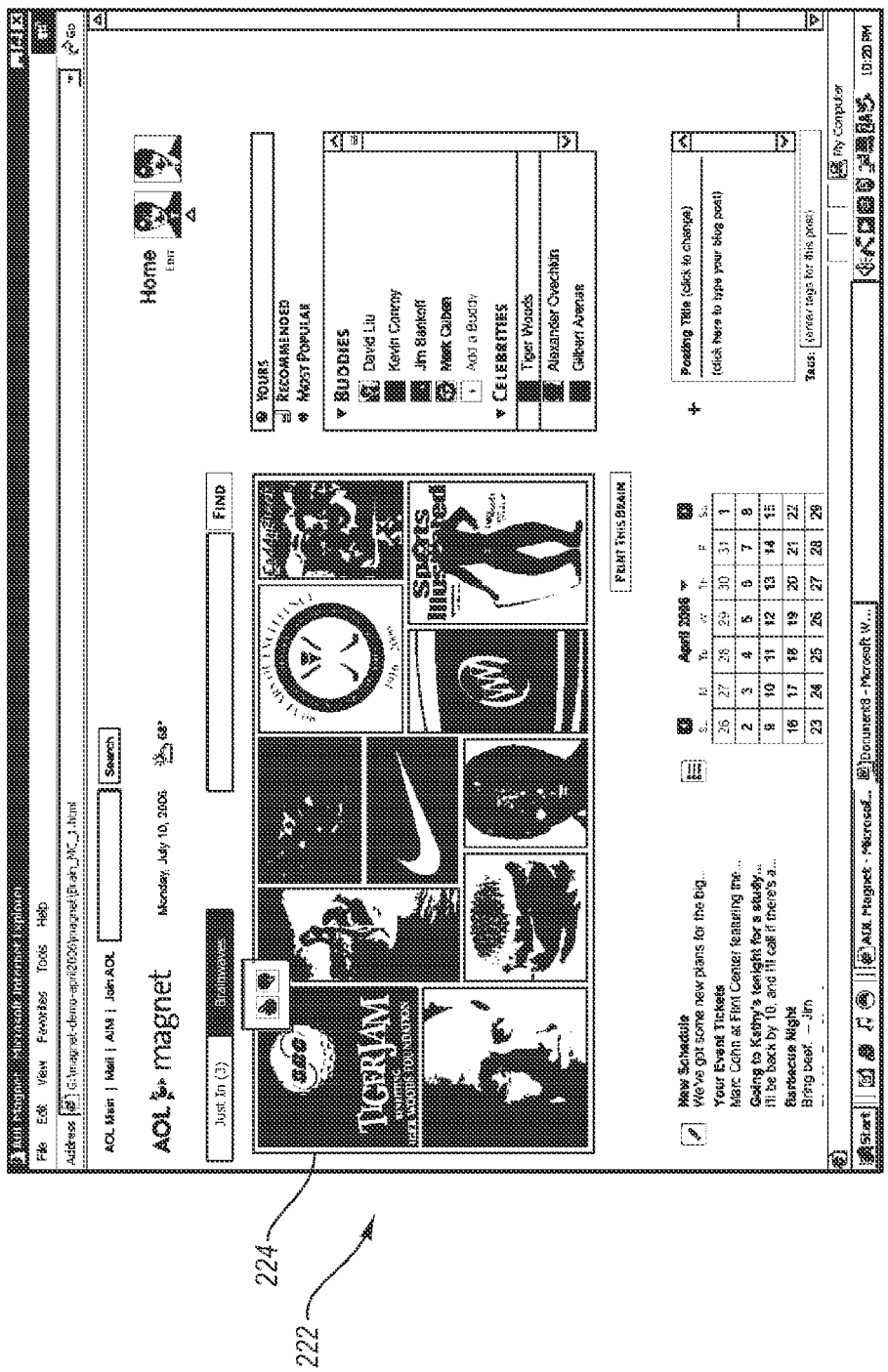
Figure 8:
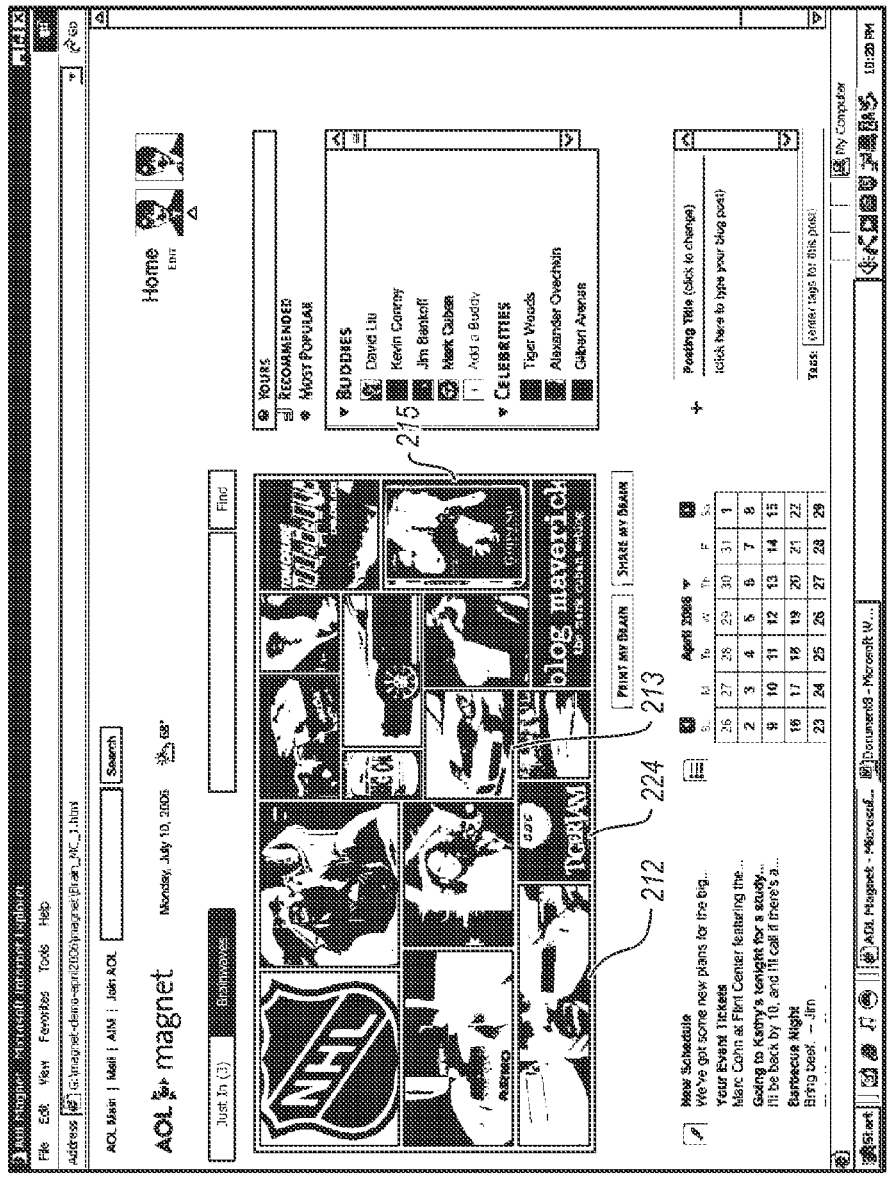
FIG. 8 illustrates an exemplary user interface displaying an updated profile image cloud.

FIG. 6A also illustrates that profile image clouds of other entities may also be viewed and/or accessed by the user. For example, celebrities 220 is another category in which entities may be identifiable. As shown in FIG. 7D, when the user selects celebrity 220a, the user can view the celebrity profile image cloud 222 containing images 224 and can approve/disapprove of any or all of these images. In one embodiment, a celebrity profile image cloud 218 may not be a true depiction of the celebrity's interests, but rather a public persona that the celebrity wishes to project. For example, a movie star celebrity may only wish to have predefined features pertaining to material that promotes his/her public image represented in the celebrity profile. This illustrates the flexibility of the present invention in a user being allowed to develop various personas that can be projected via image clouds. Of course, the ability to have multiple personas extends to any user, not just celebrities. So, if a user wants to make available one persona to certain members of its social network, but another persona to the rest of the world, the user can activate and/or deactivate certain features that the user has in her profile.

Referring back to FIG. 6A, another category in which entities could be placed is communities 230. Communities include a composite profile of two or more entities. For example, the profiles of all of a user's buddies may be merged to form a composite profile and displayed via a single "all buddies" profile icon 230a. Another type of community can be created based on geographic region. For example, the system may provide a view of the combined user profiles in the community of New York City 230b, or the community of California 230c, which the user can select to view an image cloud representing what the collective users of those regions are currently interested in. Thus, a community profile can be defined by various demographics including, but not limited to, the user's social network, a geographic region, or users of a particular gender, race, age, interests, and the like.

A user can view and interact with the celebrity and community profiles similarly to how is done for buddy profiles. Upon receiving these user interest activities, the system updates the user's profile, which, in turn, updates the user's profile image cloud 200A, shown in FIG. 8. As shown therein, the user's profile image cloud has changed to reflect images 212, 213, 215, 224 that are also a part of the user's buddies' profile image clouds. As will be appreciated, by the user adopting these images and their corresponding features and/or interests into the user's own profile, the user's profile will be correspondingly updated.

The user's social network may provide enhanced features which assist a user in identifying third party profiles (including buddy, celebrity and community profiles). As mentioned above, similar or dissimilar profiles can be identified to the user. Similarity can be broadly or more narrowly tailored depending on the level of profiling utilized. A particular user can have more than one profile associated therewith. So, if the user wants comparisons performed based on one or more profiles, the one or more profile can be matched up with third party profiles having the same feature vector(s) and/or interest vector(s). One example of where this can be useful is when a user wants to know which of her buddies is like-minded right now. When buddies having the same or similar profiles identified, the user can start an IM session with one or more of those buddies. The same methods can be applied to find buddies who have completely different profiles, celebrities who have the same profile, a dating prospect who has similar profiles and is in their same location, or for other purposes. In one embodiment, the display of similarity or dissimilarity of buddy profiles can be dynamically adjusted in real time as the user and the user's buddies change their interests over time.

Figure 9:
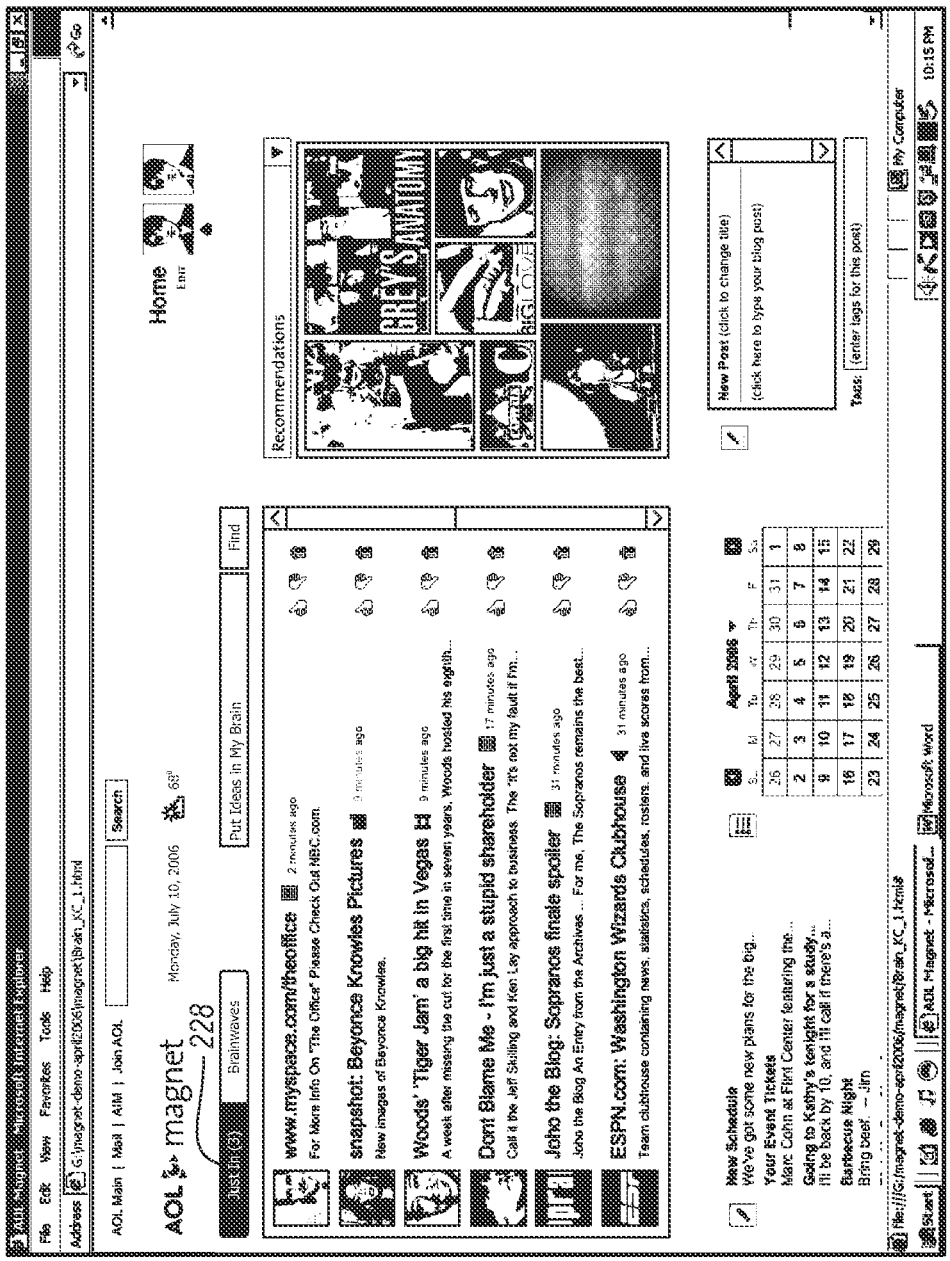
FIG. 9 illustrates an exemplary user interface displaying updated recommended content based from the updated profile image cloud.

A user may share her updated profile with other users through a sharing tool. The user may also view updated recommended feed content based on the user's updated profile, such as by selecting an icon 228. FIG. 9 illustrates that recommendation content can be dynamically updated based on changes in the user's profile. FIG. 9 also shows another embodiment for displaying recommended feed content. As shown, an inbox 166 now has updated feed content 170 related to the images that the user accepted from the profiles of other users in her social network. Furthermore, a recommendation image cloud 186 is displayed showing images relating to feeds currently available related to the user's profile.

The foregoing thus illustrates the ease by which the user can readily adopt interests in an active and engaging manner using a social network.

Concepts of Personalization

As illustrated in the exemplary screen shots of FIGS. 1 through 9, one aspect of the present invention is to associate users with personalized content on a real-time basis. The goal of personalization is to create desirable perceptions and responses from the user and encourage a user to continue to use the system while avoiding those undesirable perceptions that discourage users from using the system.

Desirable Perceptions from the point of view of a user: (1) seeing what the user wants; (2) anticipating user interests; (3) changing recommendations when the user wants; and (4) having a user read everything recommended. Perceptions to avoid from the point of view of the user: (1) avoid delivering the same content; (2) avoid recommending useless content; (3) avoid delivering old content when the user really wants something new; (4) avoid delivering content on only a few of the user's interests—if the user has a lot of interests, provide content on as many interests as possible; and (5) avoid staying on an interest when the user has moved on to generate different interests.

The image clouds used for the initial interests conversation starter (i.e., bootstrap), profiles, recommendations, popularity content, and/or search content, facilitate personalization by making the personalization experience more appealing and intuitive for the user. Images are generally easier for user to quickly assimilate and comprehend than the text used to describe the same concept. While the image clouds of the present invention are not limited to any particular personalization system, one exemplary network environment for implementing a personalization system will now be described.

Figure 10:
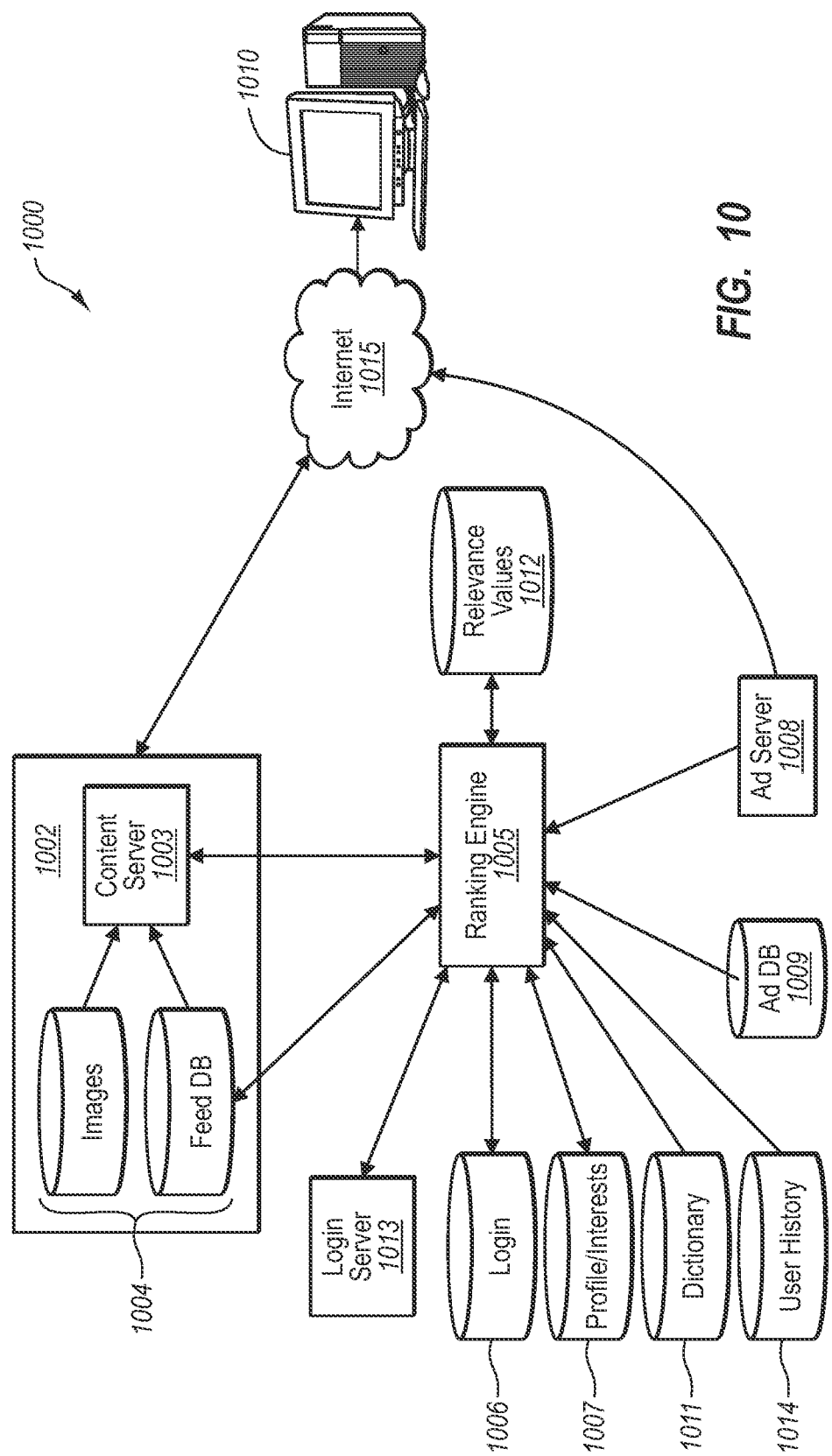
FIG. 10 illustrates an exemplary network environment for performing aspects of the present invention.

FIG. 10 is a diagram of an exemplary embodiment of a system 1000 for personalizing content to a user. As shown in FIG. 10, images and feed content, such as articles in an online publication, are stored in a database or other content repository 1004 at a content site 1002. Content site 1002 also includes content server 1003, which is coupled to content database 1004. The embodiment described herein uses the Internet 1015 (or any other suitable information transmission medium) to transmit the contents from content server 1003 to a computer 1010, where the contents are viewed by a user via a web browser, or the like. In an exemplary embodiment, HTTP protocol is used for fetching and displaying the contents, but any suitable content display protocol may alternatively be employed.

In order to personalize the information for a particular user, a login server 1013 is provided to identify each unique user through a login procedure. Of course, some users will not be identifiable but may still use the system as an anonymous user. In the presently described embodiment, information associated with a given user is divided into one or more databases (or any other type of content repository). One server 1006 contains information facilitating user login and password registration, and a second database 1007 is used to store user profile data. Profile database 1007 contains user profiles, versions of user profiles (or snapshots), and earmarks separate user profiles. Data in profile database 1007 is used by a ranking engine 1005 to rank content, contained in content database 1004, for each user.

Various other databases may hold information that can contribute to personalizing content for a user. A dictionary database 1011 stores thousands of potential features. Currently, the dictionary database 1011 can use a repository of over 25,000 computer-generated features. Additionally, the present invention allows a user to add to this repository. For example, when a user types in a word that is not found in the repository, but the system determines that that word is a significant term that should be included in the interest, that term can be added to the repository for future reference. Terms in the repository can include lists of significant persons or places, for example, musicians, rock groups, sports figures, political figures and other famous people. Terms in the repository can also be in different languages.

A user history database 1014 holds information relating to a user history where for users who are anonymous. A relevance database 1012 holds data relating to content relevance values which represent the strength of reader's preference for viewing a given content item. For example, the relevance database may hold rankings, read history, and the like for particular content items.

The present invention also contemplates that advertisement content can be personalized and presented to a user. Thus, as shown in FIG. 10, ranking engine 1005 may communicate with an advertisement database 1009 and advertisement server 1008 to rank and present advertisement content (whether images, feeds, or other type of content), to a user.

While ranking engine 1005 is shown as a single element, ranking engine 1005 can include a plurality of servers that are each configured to perform one aspect of personalization in parallel, thus distributing the processing requirements. Furthermore, all of the elements shown to the left of internet 1015 can be part of the same site, or, alternatively, can be distributed across multiple sites and/or third party sites.

Thus, any entity (i.e., users and/or content) can be assigned one or more features which can then be used to determine interests to generate a profile for that entity. Features can be visible or transparent. That is, some features may be viewable, selectable, and/or usable by users. Other features, however, may be unviewable, unselectable, and/or unusable by users. For example, computer generated significant features will unlikely be human consumable. However, features such as people, places or categories will likely have a human readable form.

In one embodiment, computer generated interests are created by analyzing a broad set of textual information related to an entity and determining which words and phrases are significant for a particular entity. For example, with regard to a group of articles, interests can be defined for each article and used to distinguish one article from another. As will be described below, a composite profile can also be created for the group of articles. The computer generated features can be determined by analyzing articles, search logs, and the like in order to mine this information. In one embodiment, duplicated phrases are eliminated within a particular interest.

In another embodiment, features can be defined from different sources other than being computer-generated. For example, users may be able to define certain features (such as tagging). Or, the features may be available from demographic information, such as names or places. In these cases, the features may be in human readable form.

In one embodiment, a computer-generated feature software analyzes content and determines significant words related to these articles. In one example of an article, features for identified to create a feature vector for the article. In addition, an interest vector for an article can be created by counting all the occurrences of each word in the article and creating an interest vector whose components comprise the word frequencies. The article can thus be represented by a point in a high-dimensional space whose axes represent the words in a given dictionary. The software attempts to eliminate words that are too commonly used that don't contribute to determining a unique feature (e.g., 'stop words' such as "the," "an," "and," etc.). Stems of words are used so that, for example, "see" and "seeing" are considered to be the same word.

The software can identify features such as categories (e.g., science, education, news) and can identify features that are meaningful in that particular context. The reverse might also be true where the software concludes, based on identifying certain meaningful words that the content item belongs to a particular category. In some cases, recommendations can then be based on a category, which provides potential content recommendations. For example, a user may begin expressing interest in a particular sports figure. However, if it becomes apparent that a user wants content about anything relating to the sports team to which the sports figure belongs, the system can recommend more content on the feature that is category-based, rather than specifically using the sport figure's name as a feature.

The present invention also assigns an interest weighting to each feature for each entity or group of entities. In one embodiment, certain features can have a greater weight than others. For example, names of people may carry a greater weight than computer generated words/features. Furthermore, interest can be presented both positively and negatively. For example, a negative rating from a user may assign a negative interest to a feature.

Thus, embodiments of the invention are directed to determining a set of significant features to create feature vector(s), attaching weighting to features to create interest vector(s), resulting in profiles. The invention also includes comparing, combining and/or ranking profiles. Various algorithmic models can be used to implement embodiments of the present invention. The present invention contemplates that different test implementations could be used with users being able to vote or provide input on the best implementations. The 'engine' that drives this test bed is relatively flexible and easy to modify so that a reasonably large number of permutations can be tried with a flexible user interface that allows users to easily provide input.

The system of the present invention performs the above functions by using feature vector(s) and/or interest vector(s) to create one or more profiles for each entity. The profile of an entity forms the input to the adaptive ranking engine 1005. Since the present invention accounts for the possibility of negative interests, it is possible to account for negative data. The output of the ranking engine is a value which represents the strength of a particular user's preference for reading that particular content item. In this manner, content items of any type can be rank ordered by the numerical value of the output of the ranking system. This allows for comparison-type functionality such as displaying images in image clouds, how similar/dissimilar entities are from each other, and the like.

Figure 11:
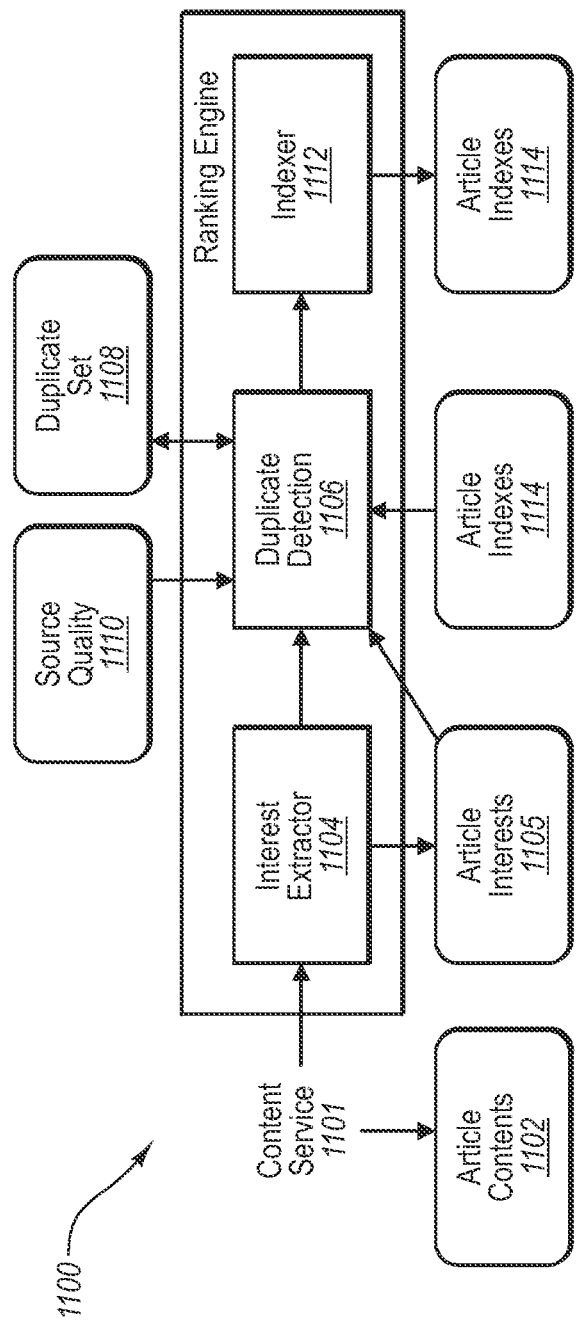
FIG. 11 illustrates a process for generating a profile for a content item.

With reference to FIG. 11, together with FIG. 10, an exemplary embodiment 1100 of processes and systems for generating a feature vector and an interest vector for a content item is depicted. When a content service 1101 (which could be the content site 1002) identifies article content 1102, an interest extractor 1104 (which can be part of ranking engine 1005) evaluates all or some of the article contents 1102 (e.g., headline, title, lead, summary, abstract, body, comments) to determine features and frequency of features. It may, in some cases, be advantageous to use more than just the headlines of news articles to perform the profiling because of the small number of words involved. In such cases, it is possible to include a summary of the article for use in generating the profile. The full article is likely to be too long and may slow down the computation of the ranking engine. A summary allows a richer and more specific match to user interests. A summary may consist of the first paragraph of a news story or a more sophisticated natural language processing method may be employed to summarize the articles. Summaries generally lead to better precision in ranking articles according to user preferences than leads but may not be quite as precise as whole articles. However, the use of summaries is likely to provide better computational performance than the use of entire articles due to the fewer number of words involved.

An article 1102 is only one example of an entity that can be evaluated to generate a profile. Other entities can be used, but for purposes of this description, an article will be described. In one embodiment, the interest extractor 1104 extracts features based on their existence in the text and/or metadata associated with the entity. The interest extractor 1104 can match every 1, 2 and 3 word phrase against the dictionary 1011 to determine if certain phrases contain significance within the article. The interest extractor 1104 can add category features based on the source of the article. In one embodiment, the content of an article can be normalized to speed of processing requirement of interest extractor 1104. For example, text can be normalized using, but not limited to lower casing all alpha characters, maintaining all digits, removing all punctuation, removing excess white space, removing stopper words, and the like.

The interest extractor 1104 calculates an interest weighting for each feature depending on its significance to produce the Profile. Interests can be attached to the features by various methods based on, but not limited to, arbitrarily setting an interest for each feature to 1, frequency of occurrence of the feature in the content, location of the feature in the article (e.g., the title gets more weight than the description/summary), bolded text gets more weight, features closer to the beginning get interest weighting, and the like. Generating profiles for content items using interest extractor 1104 can be preprocessed and stored in a database, or, can be performed in real-time as the content item is identified. In one embodiment, the feature vectors and interest vectors are stored in separate databases with pointers referring to each other and to their respective content item.

The interest extractor 1104 also identifies a "maximum score" that can be attributed to an entity by summing the positive interest vectors of all of the features. This maximum score can then be used to normalize ranking scores. The interest extractor 1104 may also take into account negative interest vectors. This can be valuable if contra-indicative features are detected. In the example of 'fender' and 'amps', 'fender' can mean a car fender or a brand of sound amplifiers. The distinction may be the existence of 'amps' contra-indicating cars but positively indicating music. Thus, an article profile having one or more feature vectors and one or more interest vectors (denoted as article interests 1105) is generated.

A duplicate detection module 1106 (which can also be part of ranking engine 1005) determines whether the article 1102 is a duplicate. The duplicate detection 1106 accesses an article index 1114. In one embodiment, the duplicate detection 1106 uses the title and summary of the entities or articles to determine if they are duplicate. The duplicate detection 1106 can be engaged by certain triggers, for example, if at least 75 percent of the article can be understood using features (in other words, the system knows enough about the article to understand its significance), duplication analysis can occur on the article. In another embodiment, duplicate detection 1106 compares the feature vector and/or interest vector of the article 1102 to all other previously evaluated articles to determine if "sameness" or "importance" exists. In one embodiment, article 1102 may actually be slightly different than another article (e.g., written by different press agencies). However, if the sameness and importance of both articles are substantially the same, the duplicate detection 1106 determines that the two articles are duplicates for purposes of determining that a user does not want to be presented with two articles having substantially the same content and substantially the same importance level assigned to the content.

A tolerance range can be established to determine when articles or entities exhibit duplicity. For example, if the two entities being compared have a 95% sameness with regard to title/summary evaluation or feature/interest evaluation, then the articles could be considered duplicates. Other tolerance ranges are possible, and the user may be able to define the stringency level of the tolerance range.

Thus, if duplicate detection 1106 identifies article 1102 as a duplicate, the article 1102 can be stored as a duplicate set 1108. In one embodiment, duplicate articles are stored in sets, only the original article in the set being indexed by indexer 1112 (which can be part of ranking engine 1005). Indexer 1112 optimizes indexed search performance so that the 'best' article in the set is returned when the indexed article is recommended. 'Best' can be defined as the article from the most reliable source or the most recent version of the article.

In one embodiment, a source quality module 1110 can be used to determine if two articles having similar sameness and interest have different quality. That is, one may come from a more reliable source than the other (e.g., Reuters v. blog). So, if there are duplicate articles and article 1102 comes from a more high quality source, then the best article will be indexed by indexer 1112 as the 'best' article in the set to be returned. In one embodiment, the 'best' article may be stored in a cache to speed retrieval of the article.

Indexer 1112 creates an inverted index 1114 of the interests of an entity or article. The first time an article 1102 is identified (i.e, not a duplicate), indexer 1112 indexes article 1102 along with any corresponding profiles, metadata, or other searchable data and stores this indexed data in article index 1114 so that the article 1102 can be easily identified in storage or otherwise accessible by the system and/or a user. The next time a duplicate of article 1102 is identified, the indexed data is already stored in article index 1114. So, the duplicate article 1102 can simply be stored in a duplicate set with the original article 1102. The duplicate article 1102 and the original article 1102 are analyzed to determine which comes from the most reliable source. The highest quality article is flagged to be returned whenever a request is made to access an article from that duplicate set. Subsequent duplicate articles are analyzed to determine whether they are higher quality than the previous highest quality article and, if so, are flagged as the current highest quality article. The information in duplicate set 1108 and/or article index 1114 then becomes available for finding profiles for static entities, combining profiles of static entities together with other static entities and/or dynamic entities, and/or comparing and ranking profiles of static entities and/or dynamic entities to each other. For example, a user could identify a feature and the indexer would return all of the entities that have an interest in that feature.

FIG. 12 depicts an example of profile in a two-dimensional form with a horizontal continuum of features representing potentially thousands of words and vertical bars representing the interest assigned to each feature or word. Where the horizontal continuum represents potential words in a dictionary, each word assigned to an ith position, and the horizontal line represents a zero value vector and above the horizontal continuum represent a positive value and below the horizontal continuum represents a negative value, the profile of the entity shown in FIG. 12 could be represented as (0, 5, 0, 0, −3, 0, 3, 0, 0, −5, 0, 0, 4, 0, 0, 1, 0, 0, −1, 0, 0, 0, 3 . . . )

where a position, 0 or negative value is placed in each Wi position to represent the level of importance of that feature. The interest vector is based on the frequency of that term in the content item, although the interest vector could be based on other factors as discussed above. In some embodiments, static content may have mostly zeros and positive values, although, as shown here, it is possible for static content to also have negative value associated therewith. Words in the content that are not in the dictionary can either be ignored, or the dictionary can be expanded to contain additional Wi words, as mentioned above.

It will be appreciated that the feature vectors and interest vectors can be represented in three-dimensional form. In the three-dimensional analysis, content items containing similar concepts are found close together. On the other hand, dissimilar content items are far apart as given by a distance measure in this space. A typical metric, well-known in the art, representing the distance between two content items in this vector space is formed by the normalized dot product (also known as the inner product) of the two vectors representing the content items.

Generally, it is desirable to enable profiles to have both feature vectors and interest vectors that are reflective of the amount of interest that a particular user or content item has for a particular feature. However, in some embodiments, it may be easier to simply use only a feature vector with a binary frequency (i.e., a count of either 1 or 0) for each word as a very good approximation. For example, for headlines and leads, word frequencies are rarely greater than one. In this sense, the feature vector would also produce a binary interest descriptor, so as to simplify implementation of the present invention.

The present system uses profiles to generate personalized content. User profiles can be generated in various ways. In one example, a user profile may be a combination of all of the profiles of the content items that have been viewed by the user with old content items eventually dropping off the user profile so as to be more reflective of a user's current interests. In another embodiment, user profiles can be a combination of user viewing history as well as user ratings so that the user profile can have negative interest values associated therewith to determine what the user is not interested in. User profiles can be generated by evaluating active and passive behavior of the user. User profiles are also able to reflect positive interest in certain content as well as negative interest.

Generally, a user profile can generally have long feature vector(s) and/or interest vector(s) while the length of a feature vector and/or interest vector for other content types such as feed content, article, documents, images, and the like, is generally shorter. Therefore, the present system measures distance between the long vectors of the user profile and the short vectors of other content items. These short vectors, in one embodiment of the invention, may have binary components representing the positive presence, or negative presence of each word, thereby simplifying the computation of content relevance. The ranking engine may use the profiles for users to identify one or more content items that the user would likely be interested in reading. Various algorithms can be used by ranking engine 1005 such as, but not limited to, Rocchio's method, Naive Bayes or other Bayesian techniques, Support Vector Machine (SVM) or other neural network techniques, and the like.

Since the present invention is not dependent on a particular type of personalization algorithm to generate content, further personalization algorithms will not be described in order to prevent obscuring the present invention.

Embodiments include general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system comprising a user interface configured to display content, a method for personalizing content for a particular user, the method comprising the following operations performed by one or more processors:

identifying a user profile;

using the user profile to identify a plurality of images associated with the user profile;

contemporaneously displaying the plurality of images on a user interface, the plurality of images being grouped and displayed adjacent to or in close proximity with each other in varying sizes depending on an expected level of user interest and in one predefined area to minimize content between the plurality of images so as to minimize navigation methods required to locate the plurality of images;

receiving a positive selection of one of the plurality of images from the user;

identifying feed content associated with the positively selected image;

presenting the feed content related to the positively selected image on the user interface;

detecting a change in the user profile, wherein detecting a change in the user profile comprises identifying a selection by the user of content displayed in at least one of an image cloud profile of one or more contacts of the user, an image cloud profile of one or more celebrity profiles, or an image cloud profile of one or more community profiles defined by a demographic;

selecting new images to be included in the plurality of images; and dynamically changing the display of the plurality of images with the new images in a manner substantially real-time with the detected change in the user profile.

2. The method as recited in claim 1, wherein the user profile includes one or more features and a vector assigned to each of the one or more features to generate one or more feature vectors for the user profile;

each of the plurality of images includes one or more features and a vector assigned to each of the one or more features to generate one or more feature vectors for each of the plurality of images; and the plurality of images are associated with the user profile such that at least some of the features of each of the plurality of images matches at least some of the features of the user profile.

3. The method as recited in claim 2, wherein the expected level of user interest is based on how many of the features of each of the plurality of images matches the features of the user profile.

4. The method as recited in claim 2, wherein the features of the user profile are generated based on at least one of user interest activity or a predefined public persona.

5. The method as recited in claim 1, further comprising receiving a selection of one of the plurality of images by a third party.

6. The method as recited in claim 1, further comprising merging the user profile with one or more other user profiles to generate a community profile.

7. The method as recited in claim 1, wherein the user profile contains one or more features that are deactivated.

8. In a computer system comprising a user interface configured to display content, a method for personalizing content for a particular user using a recommendation image cloud, the method comprising the following operations performed by one or more processors:
   identifying a user profile;
   using the user profile to identify a plurality of images associated with feed content;
   contemporaneously displaying the plurality of images on a user interface, the plurality of images being grouped and displayed adjacent to or in close proximity with each other in varying sizes depending on an expected level of user interest and in one predefined area to minimize content between the plurality of images so as to minimize navigation methods required to locate the plurality of images;
   receiving a positive selection of one of the plurality of images from the user;
   identifying feed content associated with the positively selected image; and
   presenting the feed content related to the positively selected image on the user interface; and
   modifying the user profile based at least in part on a profile associated with the feed content.

9. The method as recited in claim 8, further comprising:
   receiving a negative selection of one of the plurality of images from the user; and
   modifying the user profile based at least in part on the negative selection of the image.

10. The method as recited in claim 8, further comprising:
    detecting when a user hovers over a particular image using a pointer device communicating with the user interface; and
    displaying a user interest icon configured to allow a user to select one or more of (1) approval, (2) disapproval, or (3) noncommittance.

11. The method as recited in claim 8, wherein displaying the plurality of images on a user interface comprises displaying the feed content associated with the plurality of images on the user interface and linking the images to the feed content such that when the user selects one of the images, the corresponding feed content is highlighted.

12. In a computer system comprising a user interface configured to display content, a method for personalizing content for a particular user using a popularity image cloud, the method comprising the following operations performed by one or more processors:
    identifying one or more popular topics;
    using the one or more popular topics to identify a plurality of images associated with the one or more popular topics, the plurality of images being associated with feed content;
    contemporaneously displaying the plurality of images on a user interface, the plurality of images being grouped and displayed adjacent to or in close proximity with each other in varying sizes depending on a popularity of a topic associated with each image in one predefined area to minimize content between the plurality of images so as to minimize navigation methods required to locate the plurality of images;
    receiving a positive selection of one of the plurality of images from the user;
    identifying feed content associated with the positively selected image;
    presenting the feed content related to the positively selected image on the user interface; and
    modifying the user profile based at least in part on a profile associated with the feed content.

13. The method as recited in claim 12, wherein the one or more popular topics are based on a particular demographic being at least one of a user's social network, a geographic region, race, age, interest, religion, and the like.

14. The method as recited in claim 12, further comprising:
    receiving a negative selection of one of the plurality of images from the user; and
    modifying the user profile based at least in part on the negative selection of the image.

15. The method as recited in claim 12, further comprising:
    detecting when a user hovers over a particular image using a pointer device communicating with the user interface; and
    displaying a user interest icon configured to allow a user to select one or more of (1) approval, (2) disapproval, or (3) noncommittance.

16. The method as recited in claim 12, wherein displaying the plurality of images on a user interface comprises displaying the feed content associated with the plurality of images on the user interface and linking the images to the feed content such that when the user selects one of the images, the corresponding feed content is highlighted.

17. In a computer system comprising a user interface configured to display content, a method for personalizing content for a particular user using a search image cloud, the method comprising the following operations performed by one or more operations:
    identifying a search request including one or more search terms;
    using the one or more search terms to generate a search result having feed content;
    using the feed content to identify a plurality of images; and
    contemporaneously displaying the plurality of images on a user interface, the plurality of images being grouped and displayed adjacent to or in close proximity with each other in varying sizes depending on a similarity of the feed content to the one or more search terms and in one predefined area to minimize content between the plurality of images so as to minimize navigation methods required to locate the plurality of images;
    receiving a positive selection of one of the plurality of images from the user;
    identifying feed content associated with the positively selected image; and
    presenting the feed content related to the positively selected image on the user interface; and
    modifying the user profile based at least in part on a profile associated with the feed content.

18. The method as recited in claim 17, further comprising:
    receiving a negative selection of one of the plurality of images from the user; and
    modifying the user profile based at least in part on the negative selection of the image.

19. The method as recited in claim 17, further comprising:
detecting when a user hovers over a particular image using a pointer device communicating with the user interface; and
displaying a user interest icon configured to allow a user to select one or more of (1) approval, (2) disapproval, or (3) noncommittance.

20. The method as recited in claim 17, wherein displaying the plurality of images on a user interface comprises displaying the feed content associated with the plurality of images on the user interface and linking the images to the feed content such that when the user selects one of the images, the corresponding feed content is highlighted.

\* \* \* \* \*